United States Patent [19]

Houda et al.

[11] Patent Number: 4,660,029

[45] Date of Patent: Apr. 21, 1987

[54] METHOD OF PROVIDING RASTER INFORMATION FOR A GRAPHICS DISPLAY EMPLOYING LINKED LISTS

[75] Inventors: Pavel Houda; Richard A. Springer, both of Tualatin; Rodney B. Belshee, Tigard, all of Oreg.

[73] Assignee: Tektronix, Inc., Beaverton, Oreg.

[21] Appl. No.: 628,182

[22] Filed: Jul. 6, 1984

[51] Int. Cl.⁴ .............................................. G09G 1/14
[52] U.S. Cl. .................................. 340/744; 340/747; 340/799; 364/521
[58] Field of Search ............... 340/726, 744, 747, 750, 340/798, 799; 364/518, 521

[56] References Cited

U.S. PATENT DOCUMENTS

| | | | |
|---|---|---|---|
| 4,203,107 | 5/1980 | Lovercheck | 340/744 |
| 4,249,172 | 2/1981 | Watkins et al. | 340/726 |
| 4,300,206 | 11/1981 | Belleson et al. | 364/900 |
| 4,458,330 | 7/1984 | Imsand et al. | 340/744 |
| 4,496,976 | 1/1985 | Swanson et al. | 340/744 |

FOREIGN PATENT DOCUMENTS

| | | |
|---|---|---|
| 0005034 | 10/1979 | European Pat. Off. . |
| 0048625 | 9/1980 | European Pat. Off. . |
| 2119982 | 5/1982 | United Kingdom . |

OTHER PUBLICATIONS

Character Position Control Apparatus by G. I. Findley et al., IBM Technical Disclosure Bulletin, vol. 24, No. 4.

Primary Examiner—Gerald L. Brigance
Assistant Examiner—Jeffery A. Brier
Attorney, Agent, or Firm—John P. Dellett; Robert S. Hulse

[57] ABSTRACT

Graphics commands for a display are listed and divided into sublists corresponding to separate strips or bands of the display, and these sublists drive the display memory consecutively and substantially concurrently with the processing of additional sublists. Graphics commands relating to graphics extending between bands are transferred to successive sublists during processing to provide their display in successive bands. A pair of band size bit map memories are alternately loaded with band information and read out.

9 Claims, 21 Drawing Figures

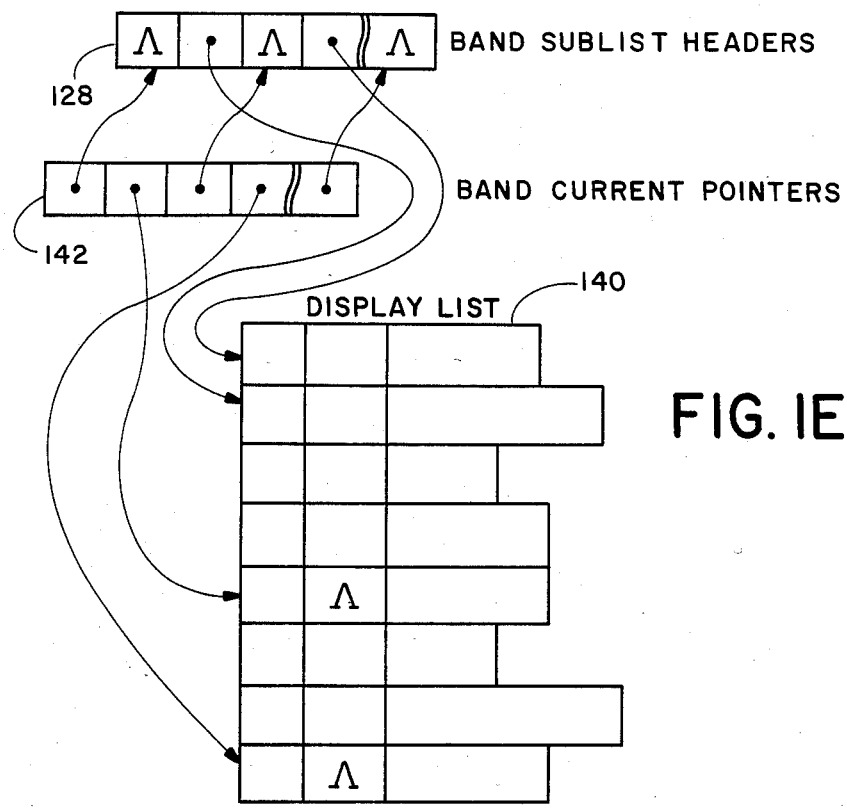
FIG. IE
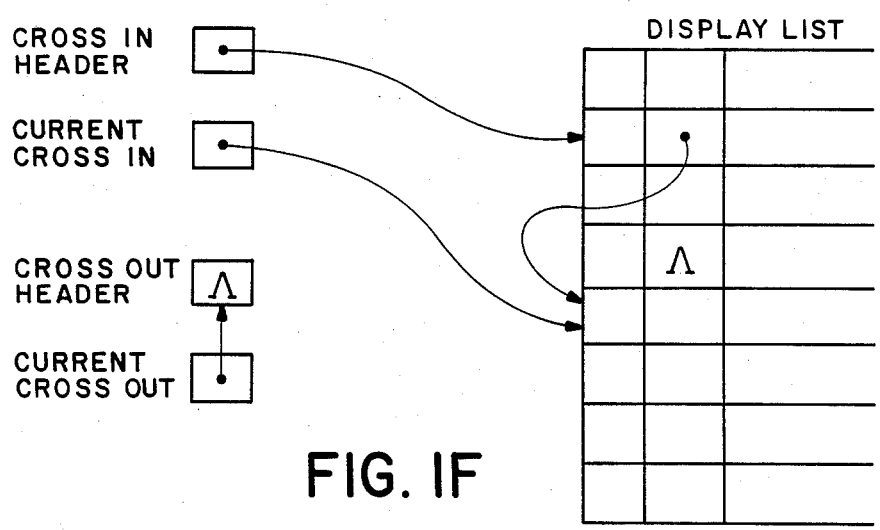
FIG. IF

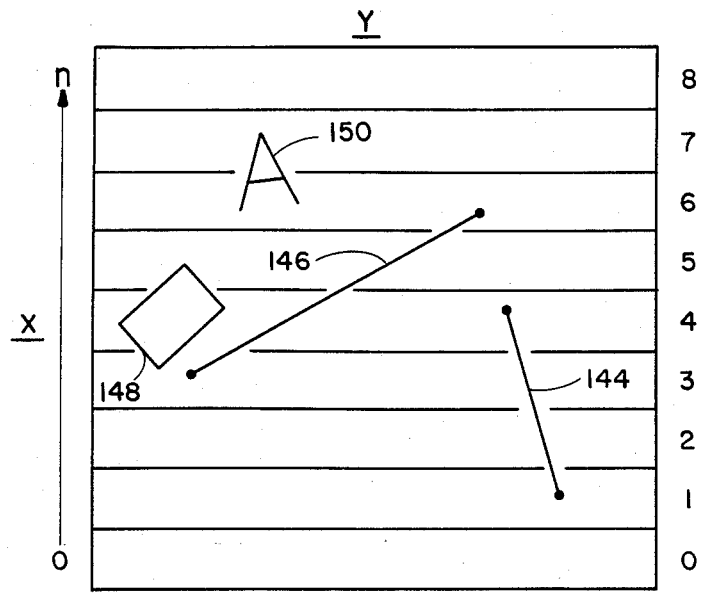
FIG. 1G
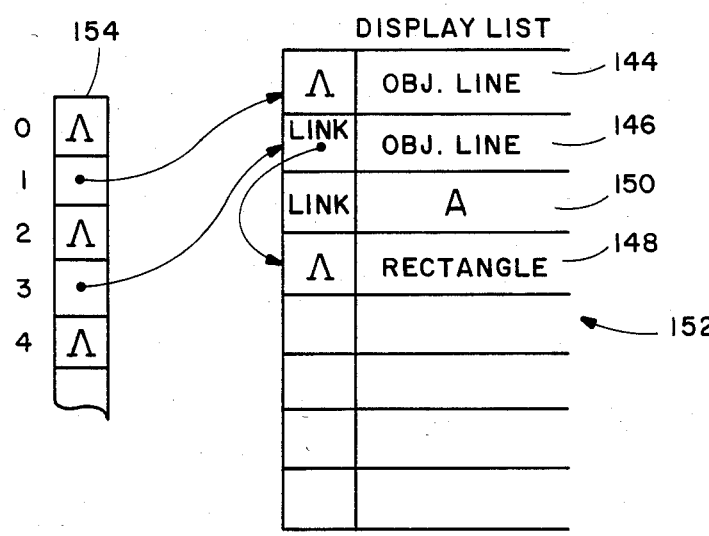
FIG. 1H
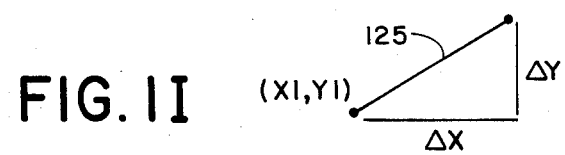
FIG. 1I
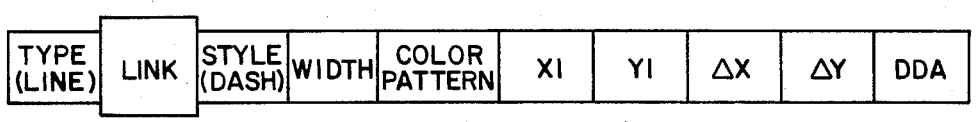

METHOD OF PROVIDING RASTER INFORMATION FOR A GRAPHICS DISPLAY EMPLOYING LINKED LISTS

BACKGROUND OF THE INVENTION

The present invention relates to a method of providing pixel information for a hard copy graphics presentation, and particularly to such a method requiring a minimum bit map memory space and operating in conjunction with a hard copy device to avoid delay in providing raster information.

In graphics display devices the information relative to objects for display may be received as a series of high level commands, each indicating the type of graphics object to be displayed and its position. Thus, such command may indicate a line is to be drawn including the origin of the line and its length in x and y coordinates. The graphics device then typically "pixelates" this information or "draws" elemental or dot portions of the line for entry into a pixel bit map memory. The pixel bit map memory is scanned or read out to provide an eventual display, using an ink jet copier or the like.

Conventionally, all of the commands would be received for the drawing of various objects, and all of these objects would be pixelated and "laid in" to a large bit map memory before the copier starts its operation. This involves a considerable delay in loading the bit map memory before hard copy print out can begin.

Although it is possible to portray a portion or strip of the display, thereby requiring a much smaller memory space for the bit map, nevertheless the whole bit map is ordinarily calculated or written before the presentation of each strip in order to be responsive to the graphics commands received. Thus, the bit map may be determined again and again, but only successive strips of the bit map would actually be "laid in" to the bit map memory. This involves considerable computing capability to provide the repeated bit map information.

SUMMARY OF THE INVENTION

In accordance with the present invention in a particular embodiment thereof, the commands from a processor or the like, which describe graphics objects to be written in a display, are placed in a display list, and the display list is divided into band sublists corresponding to narrow strips or bands of a display. After the determination of the bands into which certain graphics objects are initially located, the printing or display of the information may begin. Many graphics objects would, of course, extend across a number of bands and for that reason it has been heretofore thought necessary or desirable to pixelate the entire display before execution. In the method according to the present invention, the graphics objects are pixelated within a band until it is determined that a particular object crosses from such band to a next band. For crossing objects, a separate crossing list is formed, linking objects into a further band, and this crossing list is merged with the band sublist of such further band whereby the crossing objects, and objects beginning in the further band, can be later pixelated.

In the above manner, graphics may be input on a fairly high level basis and pixelated piecemeal for strip output allowing the use of a much smaller bit map memory than heretofore required, and allowing the initiation of a printing operation prior to the pixelation of the total display.

It is accordingly an object of the present invention to provide an improved method of supplying raster information for a graphics display, which method is responsive to high level graphics commands, but which employs a relatively small graphics bit map memory space.

It is a further object of the present invention to provide an improved method of supplying raster information for a graphics display wherein a hard copy printer or the like may begin operation before the total input of graphics commands for the display has been pixelated or inserted in bit map memory.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters in general refer to like elements.

DRAWINGS

FIG. 1A is a schematic view of a graphics image as produced by a multiplicity of pixels, FIG. 1B is a block diagram of processor operated printer apparatus for using the method according to the present invention, FIG. 1C is an illustration of a graphics display list, FIG. 1D is a further view of the aforementioned display list in conjunction with an array of band sublist headers, FIG. 1E is an illustration of the aforementioned list as further provided with an array of band current pointers, FIG. 1F illustrates the aforementioned list in conjunction with crossing headers and pointers for crossing lists, FIG. 1G is an illustrative drawing for further explaining the operation of the display list, FIG. 1H is a further depiction of the aforementioned display list as responsive to the graphics illustrated in FIG. 1G, FIG. 1I illustrates an input graphics command, and FIGS. 1J through 12 comprise flow charts illustrating the procedure according to the present invention.

DETAILED DESCRIPTION

Figure 1A:
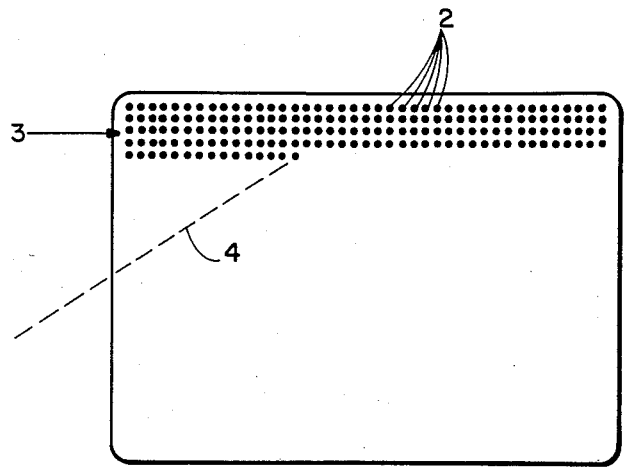

Referring to the drawings and particularly to FIG. 1A, a graphics display is illustrated which is composed of a multiplicity of dots or "pixels", 2, disposed in rows such as row 3. The rows are "drawn" or imprinted by a means indicated at 4 which may correspond to the electron beam in a cathode-ray-tube, but which in the case of a hard copy printer may correspond to an ink jet or a plurality of ink jets for imprinting individual dots or pixels. The number of pixels are actually substantially greater than in the illustration, typically numbering 4,000 pixels for the long dimension of the display by 2,000 pixels for the narrower dimension, and the pixels may be imprinted in various colors or combinations of colors.

Such a display is typically computer generated, i.e. is formed in response to a plurality of high level commands which specify the graphics object or objects to be printed. For example referring to FIG. 1I, one such command is shown which comprises the designation for a straight line on the display. The numbers X1 and Y1 indicate the origin of the line, while Delta X and Delta Y indicate the x and y length components of the line, as further depicted by line 125 in FIG. 1I. Other information in the command suitably comprises the type of graphics object, e.g. line, panel, character, rectangle, or the like. The link field will be hereinafter more fully described. The style field may indicate whether the line is dashed or not, the width field specifies the thickness of the line, and the color pattern field identifies the color of the line. The specific software for drawing a line or similar object on a screen or copier in response to a command is well known to those skilled in the art.

Figure 1B:
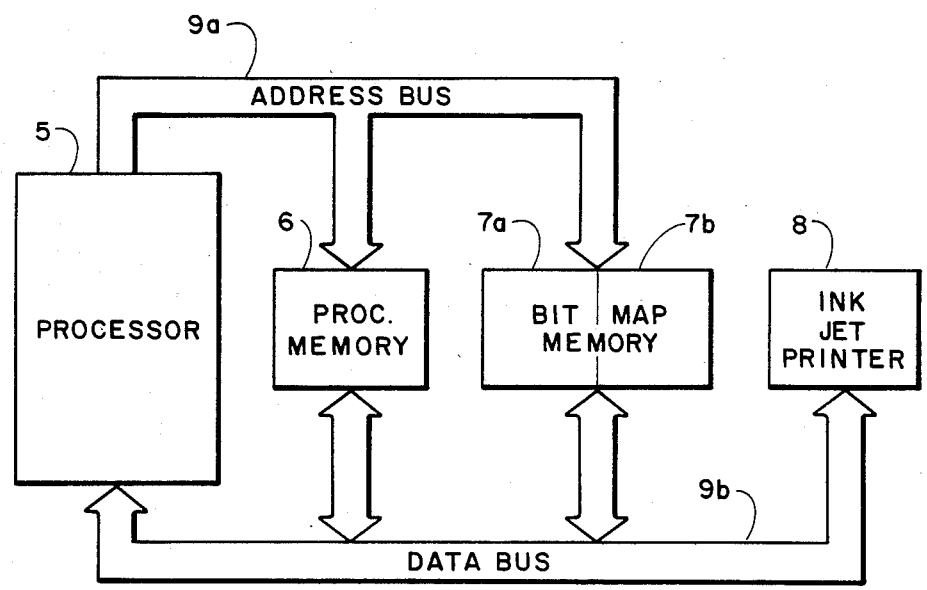

FIG. 1B illustrates a graphics system to which the present invention pertains and includes a processor 5 coupled by an address bus and a data bus, 9a and 9b respectively, to processor memory 6. The processor in a specific instance was a type 68000. Further included is a bit map memory comprising a first portion 7a and a second portion 7b that are utilized alternatively to cause ink jet printer 8 to write strips or bands of the display, for example the bands as illustrated in FIG. 1G. According to the method of the present invention, band or strip pixel information is alternately written into bit map memory portions 7a and 7b. While one section of the bit map memory is read out into the ink jet printer apparatus, the other section is receiving pixel information from the processor.

The processor operates in two passes. First, all the graphics commands are received and listed. The list is subdivided into band sublists which correspond to the bands or strips of the display. Then in a second pass, rather than pixelate the entire picture at once (which would require an enormous memory map), pixelation occurs for just one strip or band at a time. In the specific example, a strip comprised thirty-two lines such as pixel line 3 in FIG. 1A, out of a total of about 2,000 lines.

Each band sublist of the overall display list contains the graphic objects (commands similar to that shown in FIG. 1I) which begin in a particular band. For example if a line begins in band 10 and continues to band 15, then it is contained only in the band 10 sublist. For the determination of which sublist into which a given graphics object is to be inserted, the lowest X value of the object is determined and the object is sorted into the sublist corresponding thereto.

In the second pass, the pixelation is driven by a band sublist. The graphics objects are fetched from the list one at a time, and pixelated into the bit map memory. For example, a draw line routine may be employed which would require the end point and the length of the line. The line is clipped if it extends beyond the current band, and for this purpose, the starting and ending values for the given band are also fetched.

It is noted, during the second pass, when the information of an object indicates coordinates beyond the edge of the current band, a separate crossing sublist is established to contain the object command. This crossing list is merged with the band list for an ensuing band. Thus the line information is added to the next band at the proper location for continuing the line when the next band or strip is placed in bit map memory. Of course, during execution of the next band, only the object coordinates occurring in the next band (within its starting and ending values) are actually pixelated.

Figure 1C:
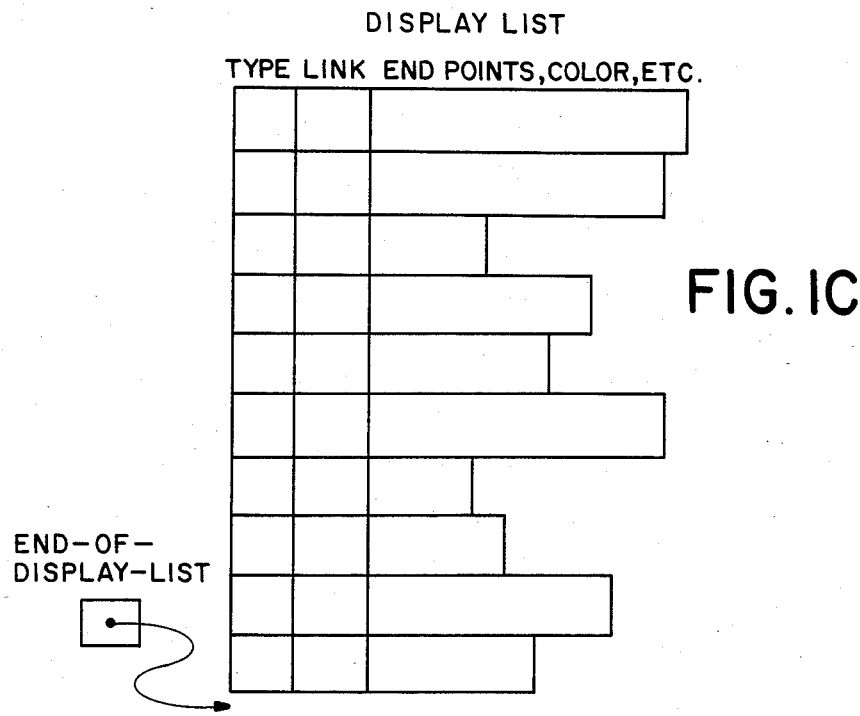

A display list is illustrated schematically in FIG. 1C. The sequential ordering implies precedence, with objects being "drawn over" other objects which preceed them in the sequential list. The display list contains plural sublists, for example the band sublists for the separate bands to be pixelated and imprinted as hereinbefore mentioned. Each graphics object command in the list has a link field, in addition to the other graphics field, wherein this link field enables the particular graphics object to be linked into a sublist. The end of display list pointer points to the last graphics object in the display list. At the time the graphics object is inserted into the display list (during the first pass), it is also linked into one of the band lists, and exactly one band list, namely the list corresponding to the band where the particular graphics object starts.

Figure 1D:
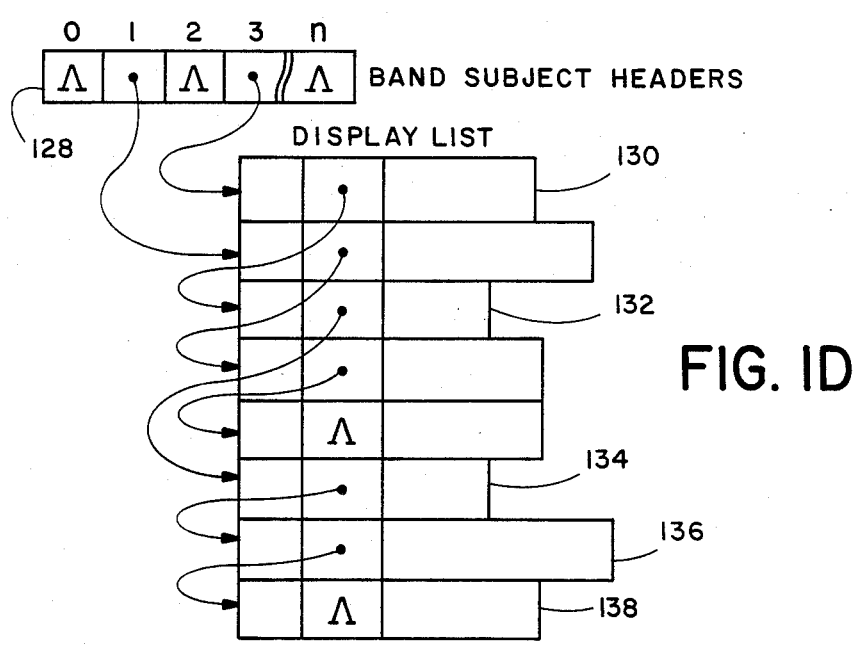

In particular, the device coordinate space is divided into n bands. An array of band headers 128 in FIG. 1D starts each of the sublists, i.e. an individual header may point to a particular graphics object which is linked with further graphics objects to form a list. For example, band sublist header 3 in FIG. 1D points to graphics object 130 which designates, in its link field, the graphics object 132. In turn, graphics object 132 is linked to objects 134, 136, and 138 in order. As can be seen, band sublist header 1 similarly starts a second sublist.

Referring to FIG. 1E, the display list 140 is further provided with "current" pointers 142 for the band sublists. A current pointer exists for each of the band sublists and these pointers are here shown pointing to the end of each sublist. Ordinarily, the header will start each band sublist, and the current band pointer will move along, pointing to the "next" object.

In addition to the headers and pointers hereinbefore described, crossing headers and pointers are employed for managing the crossover of a graphic from one band to another. (See FIG. 1F.) These headers and pointers pertain to crossing sublists, namely a cross-out sublist and a cross-in sublist. These crossing sublists are designated relative to the band that is being considered at a given time. Thus, a cross-out sublist indicates graphics objects that are going on to the next band, and a cross-in sublist indicates graphics objects coming from a previous band. A graphics object may be deleted from a band sublist and inserted into either of these crossing sublists, with a given graphics object residing at one time in only one sublist.

During scan conversion or pixelation, if an object is encountered that crosses into the next band, the object is placed in the cross-out list and this cross-out list will be formed as a chain of all items that extend into the next band. Thus the commands for crossing objects will be linked together as the cross-out list. A crossing list, like the band sublists, is wholly contained in the display list and operation thereof is hereinafter more fully described in connection with the actual procedure.

A simplified example of the listing operation will be given with respect to FIGS. 1G and 1H. Referring to FIG. 1G, illustrating the overall organization of the graphics display to be presented, such graphics display is divided, for purposes of illustration, into nine bands which are numbered 0 to 8 along the "X" axis, i.e. the shorter axis of the display. The display is provided to the printer, piecemeal, as each of the bands are first entered into one of the pixel bit map memory sections 7a, 7b and then output to the printer. The X direction of the display is actually about 2,000 pixels and the Y direction of the display is actually about 4,000 pixels in a specific example, and the display is divided into bands of thirty-two scan lines each. The illustration of the display in FIG. 1G is divided into nine bands merely for ease of illustration. Four graphics objects are to be placed in the display of FIG. 1G, a straight line 144, a straight line 146, a rectangle or area 148, and a character 150.

Referring now to FIG. 1H, the input commands for these objects have been listed in display list 152. Band header array 154 contains one entry or pointer for each of the bands. The header for band 0 is NIL since no graphics object exists in band 0. The header for band 1, on the other hand, points to graphics object 144. The link field of graphics object 144 is NIL because no other graphics object starts in band 1. The band header for band 2 is NIL inasmuch as no graphics object starts in band 2. The band header for band 3 points to graphics object 146 in the display list since this graphics object starts in band 3, while the link field for object 146 points to graphics objects 148 on the display list, thereby forming a band sublist including graphics objects 146 and 148. The band header for band 6 will point to graphics object 150. Thus, a header pointer points to the start of each band sublist.

If a line, for example line 144, doesn't terminate in band 1 during pixelation, it is linked into a crossing list which means a cross-out pointer is set to point to graphics object 144. A crossing list now contains one item, i.e. graphics object 144. Now going on to band 2, band 2 is indicated as empty so far as its band sublist is concerned, but a merge is done with the graphics object that crossed in, i.e. line 144. If other objects were contained in the band sublist for band 2, they would be merged in and pixelated into the bit map.

For band 3, the band sublist includes two items, line 146 and rectangle 148, and the crossing list also includes one item, i.e. line 144. Therefore these three items are pixelated into the bit map for band 3. As we exit band 3, two items are added to the crossing list, namely line 146 and rectangle 148.

As we proceed out of band 4, it is seen that line 144 no longer crosses. Therefore the crossing list is modified to contain only the two objects, that is line 146 and rectangle 148, while the line 144 falls away.

At any one time, one object is in one list only. As we pixelate, the object may be broken out of one list, i.e. the band sublist, and placed into another list, i.e. the crossing list, but it will only occur in one list at a time.

There is an implicit precedence in the order that commands are received from the processor regarding printing of one item "on top of" another. The crossing list and the band sublist will point at two different places in the display list, and so both pointers are followed, always doing whatever occurs first physically in the display list. The display list, being a sequential list, dictates the precedence. The crossing list and the band list together describe the objects that are actually active (that is the object or objects in the particular band).

Reference will now be made to the flow charts of FIGS. 1J through 12 describing operation of the present system. In addition to the previous definitions, the following variables have the following meanings in the flow charts:

Next-object=a pointer to the object currently being pixelated.

Next-primitive=a pointer to the next object in the current band sublist during pixelation. (This is similar to the current band list pointers as described in connection with FIG. 1E.)

Bandnum=the number of the current band.

Figure 1J:
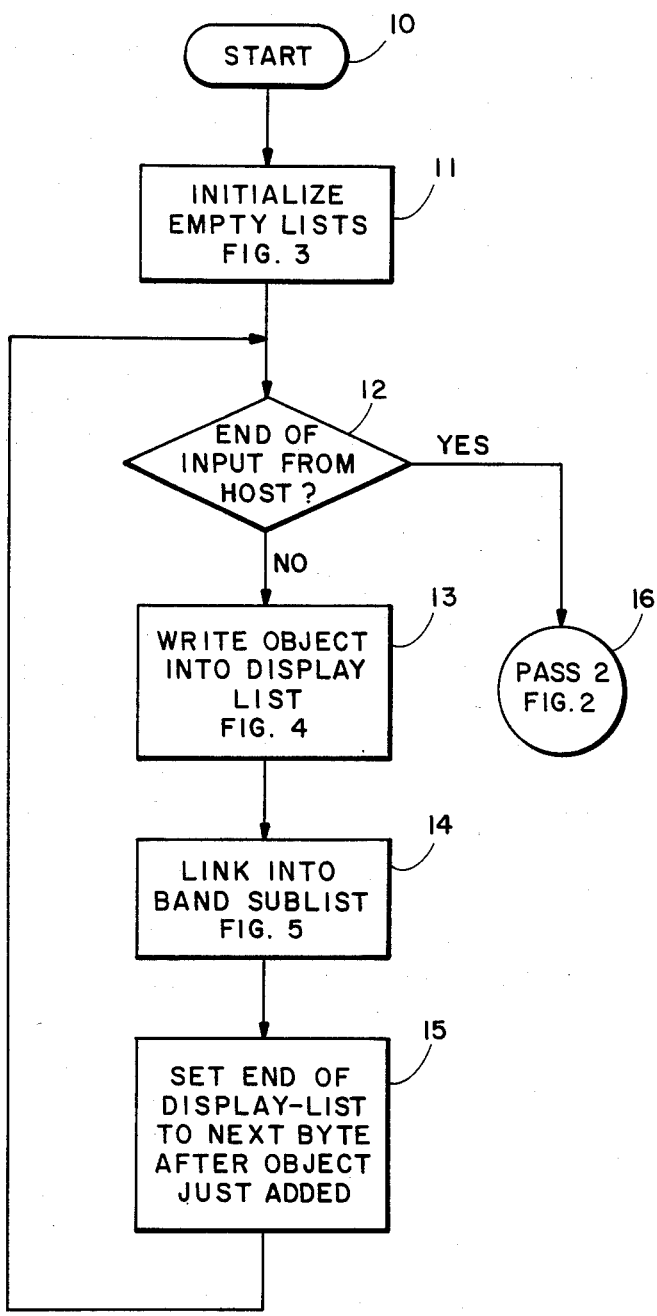
Figure 2:
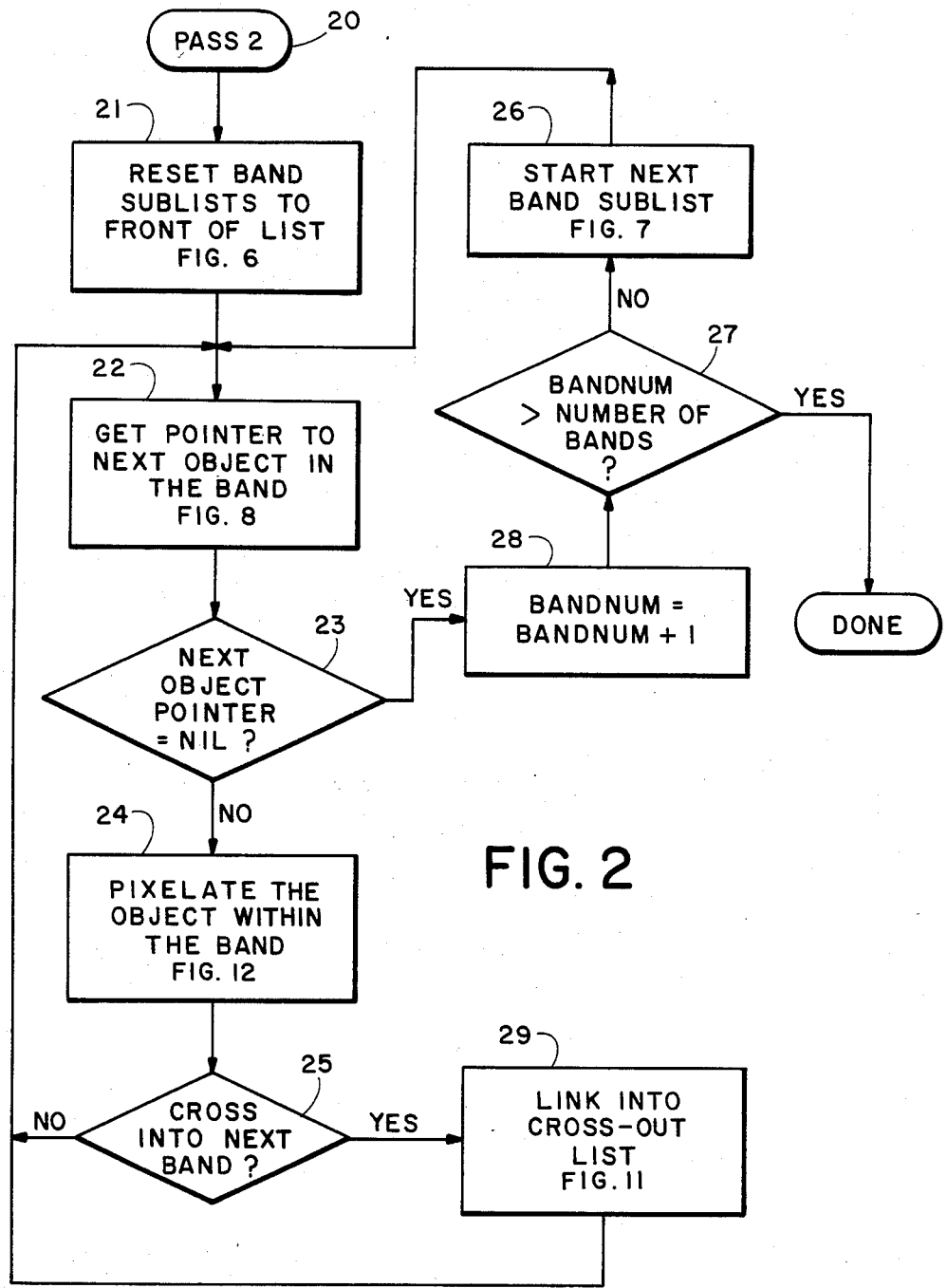
Figure 4:
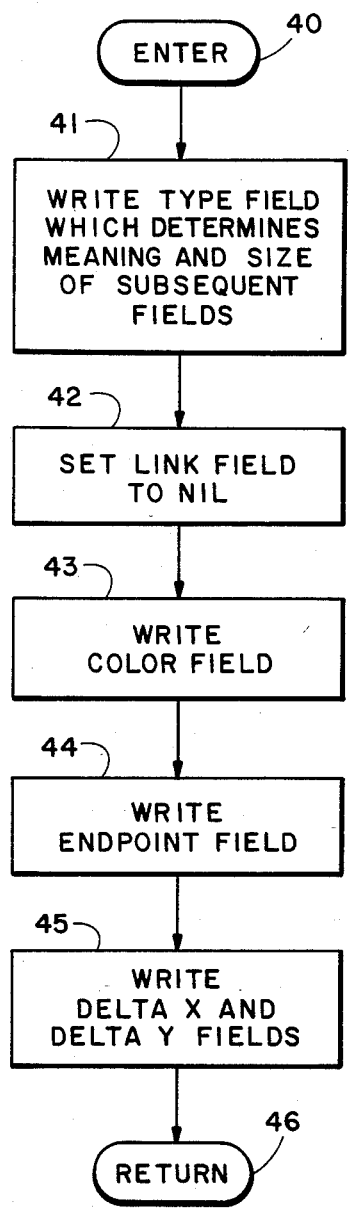
Figure 5:
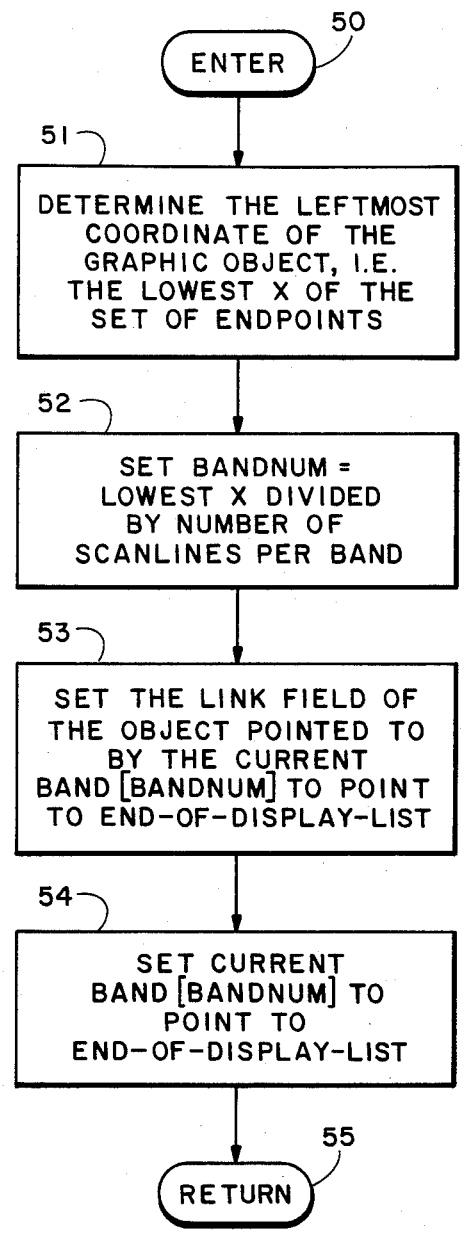
Figure 6:
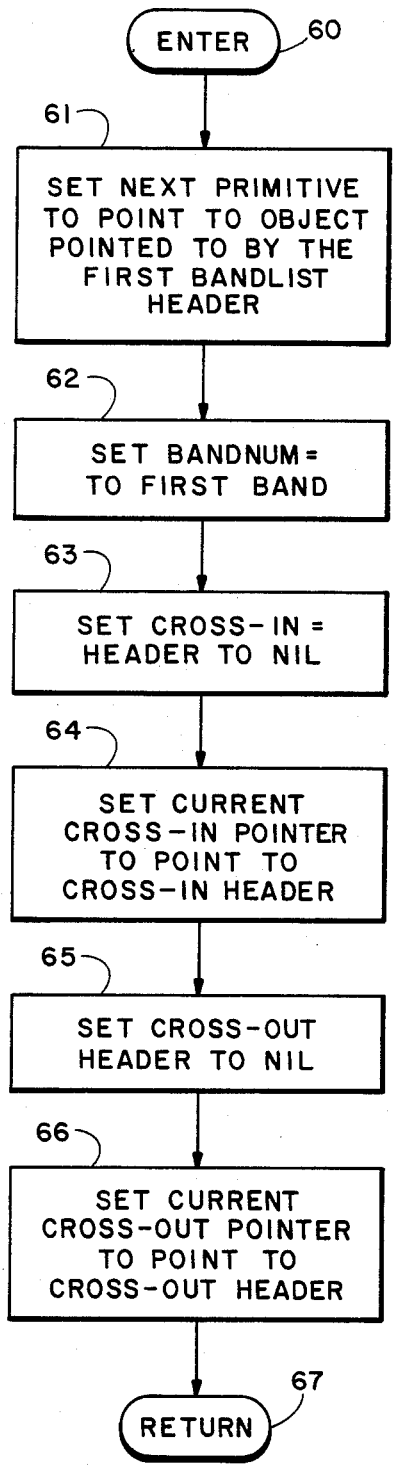

Referring to FIG. 1J, illustrating the first pass of the process, the program starts at 10 and initializes empty lists in block 11, i.e. for setting the lists to an empty condition (further described in connection with FIG. 3). Thereafter, decision block 12 is entered and if the input (e.g. from a host processor) has ended, the program proceeds to the second pass of the program (FIG. 2). Otherwise the next graphics object is written into a display list in block 13 (further described in FIG. 4). In block 14 the particular graphics object is linked into a band sublist (FIG. 5). After block 14, the end of display list pointer in FIG. 1C is advanced to the next byte after the object just added to indicate where available memory is. This corresponds to the end of the display list. The procedure continues receiving input information and placing the information into memory.

Figure 3:
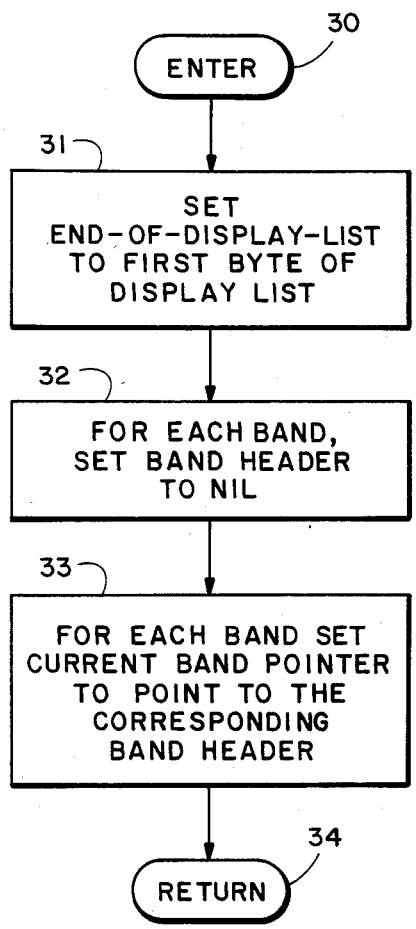

Referring more particularly to FIG. 3, pertaining to initialization for emptying the lists for initial set up, the procedure is entered at 30, and in block 31 the end of display list pointer (as illustrated in FIG. 1C) is set to the first byte of the display list. In block 32 the header (128 in FIG. 1D) is set to NIL for each band, and in block 33 the current band pointer (142 in FIG. 1E) is set to the band header for each band. Return is then made to the program of FIG. 1. As further input is received, the object is written into the display list as illustrated in FIG. 4. After entering the procedure at 40 in FIG. 4, the type field for the graphics object is written, then the link field, color field, endpoint field, and the Delta X and Delta Y fields in blocks 42 through 45.

The program of FIG. 5 is then entered at 50 to link the object into a band sublist. In block 51 the "leftmost" coordinate of the graphics object (the lowest X coordinate thereof) is determined. (For example, see FIG. 1G.) In block 52 the "bandnum" (band number) is set equal to the lowest value of X from block 51 divided by the number of scan lines per band, thirty-two in the present example. This results in the selection of the particular band in which this object starts.

In block 53 the link field of the object pointed to by the current band pointer is set to point to the end of display list pointer. In other words, the link of the last object in this band is set to point to the new object, i.e. the pointer is set to the object that is about to be added. In block 54, the current band pointer is set to point to the end of display list or the location where another object will be added. The procedure of FIG. 1J is continued until all of the graphics objects have been added to the display list.

Referring to FIG. 2, the second pass, which is called scan conversion or pixelation, is entered at 20. The band sublists are reset to the front of the list in block 21. (Reference FIG. 6.) This involves the setting of various pointers such as next primitive, cross-in and cross-out as further described in connection with FIG. 6. In the following block, 22, a value is assigned to the next object pointer as further described in FIG. 8. In decision block 23, if the next object pointer is equal to NIL, block 28 is entered and bandnum, or the number of current band, is advanced by one. If the band number is greater that the total number of bands, the routine is completed. If it is not, the next band sublist is started as indicated in block 26 and further explained in connection with FIG. 7. Returning to block 23 if the next object pointer is other than NIL, the object is pixelated so far as it is within the band, and this is further described in connection with FIG. 12. After block 24, a test is made as to whether the object crosses into the next band and if it doesn't, return is made to block 21. If it does, a link is provided into a cross-out list as further described in connection with FIG. 11.

Now returning to FIG. 6, representing general resetting for the start of pixelation, the procedure is entered at 60 and in block 61 the next primitive, which corresponds to the current pointer employed during the first pass, is set to point to the object pointed to by the first band list header, thereby requiring the next primitive pointer to point to the top of the band sublist. In block 62, bandnum is set equal to the first of the bands, for starting, and in block 63 the cross-in header is set to NIL. Likewise in block 64 the current cross-in pointer is set to point to the cross-in header. Further in blocks 65 and 66, the cross-out header is set to NIL and the current cross-pointer is set to point to the cross-out header. The procedure of FIG. 6 merely initializes the three lists, the band sublist, the cross-in list, and the cross-out list.

Figure 7:
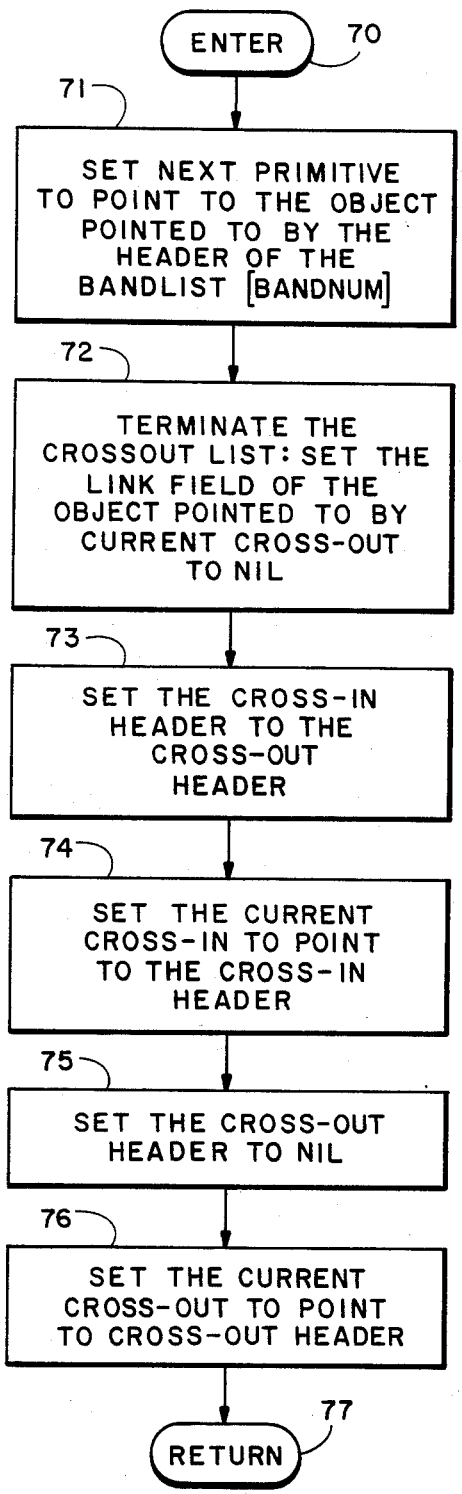

Referring to FIG. 7, the next band sublist is started, assuming there was not a further object in the present band. In block 71, the next primitive is set to point to the object pointed to by the header for the band list for the current bandnum. In block 72 the cross-out list is terminated by setting the link field of the object pointed to by current cross-out to NIL. Thus the end of the cross-out list is marked. In block 73 a cross-in header is set to the cross-out header for transferring from cross-out to cross-in for the next band. In block 74 the current cross-in pointer is set to point to the cross-in header for starting a list. In block 75 the cross-out header is set to NIL. Then the current cross-out is set to point to the cross-out header in block 76. By the procedure of FIG. 7 the cross-out list has been transferred to the cross-in list, and a new empty cross-out list is started. Also next primitive points to the band sublist for the next band.

Figure 8:
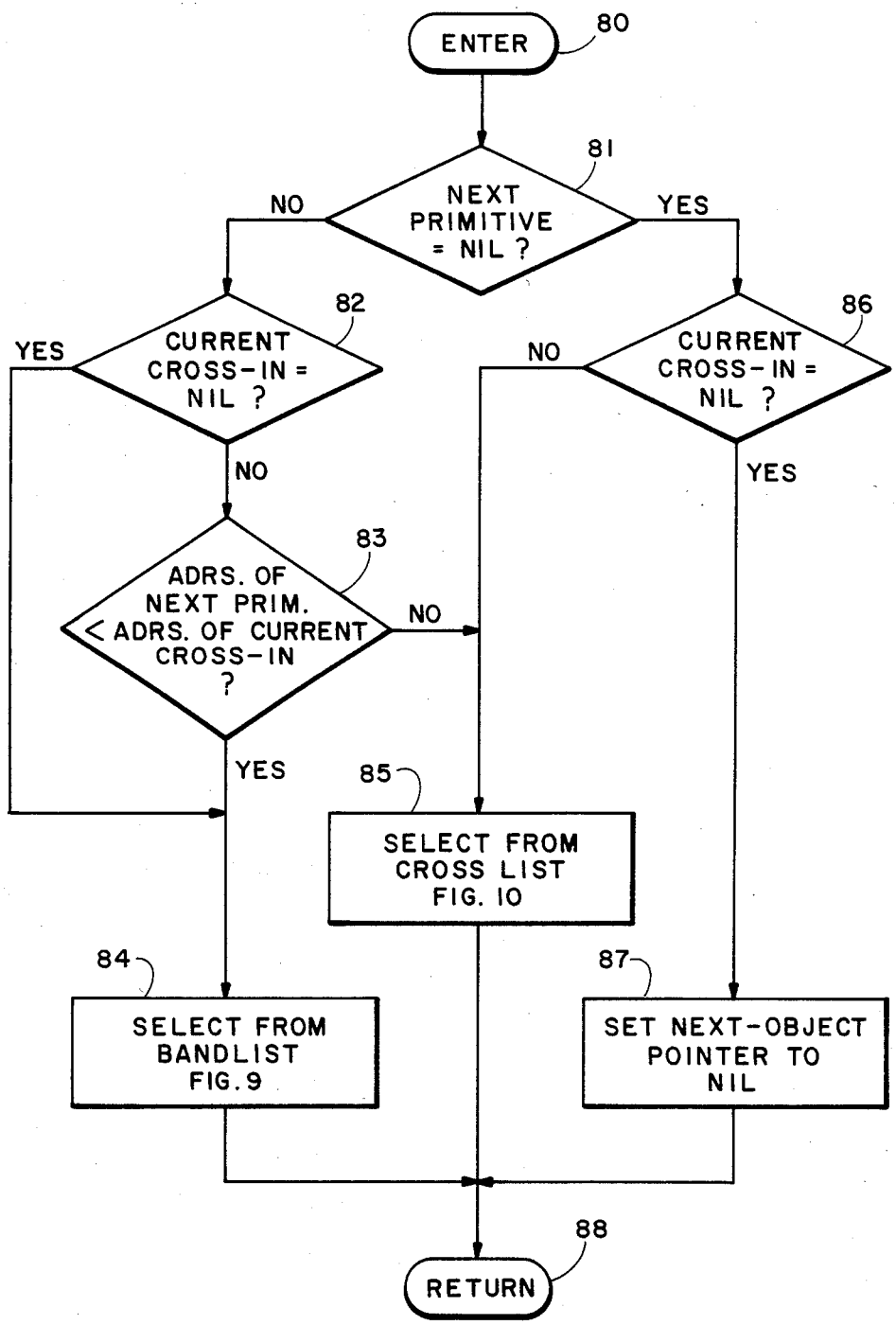

Referring now to FIG. 8, describing the merging of two lists, the band list and the cross-in list, and the determination of which object to pixelate next, first it is determined in decision block 81 whether the next primitive is NIL. If it is, it is determined in block 86 whether the current cross-in is NIL. If both are true, the next object pointer is set to NIL in block 87. However, if the next primitive is not NIL, decision block 82 is entered and the determination is made whether the current cross-in is NIL. If the current cross-in is NIL, indicating no extensions of objects from the previous band, the program proceeds on to select from the band list in block 84. If the current cross-in is not NIL, as determined in block 86, the program proceeds to block 85 to select from the cross-list as further described in FIG. 10. Also, if the current cross-in is not NIL at the output of block 82, block 83 is entered where it is determined whether the address of the next primitive is less than the address of the current cross-in. This determination enables the "writing over" of one graphics object on another, and specifically enables the most recently received graphics object to write over a previous graphics object. If the output from block 83 is yes, the band list is selected in FIG. 9, and if it is not, selection is made from the cross-list of FIG. 10. Next object is set to point to the graphics object to be pixelated.

Figure 9:
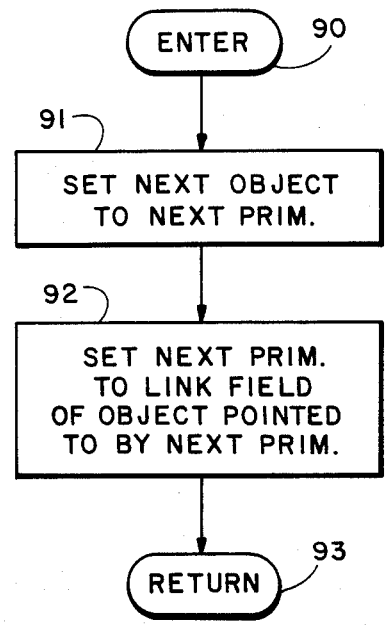

Referring to FIG. 9, block 91, the pointer, next object, i.e. the pointer to the object currently being pixelated, is set to next primitive, the pointer to the next object in the current band sublist. In the following block, 92, the next primitive is set to the link field of the object pointed to by next primitive. In other words, advance is made down the list by one, i.e. the next primitive pointer is advanced by one and next object is set to next primitive. A value has been given to next object determining what will be pixelated next.

Figure 10:
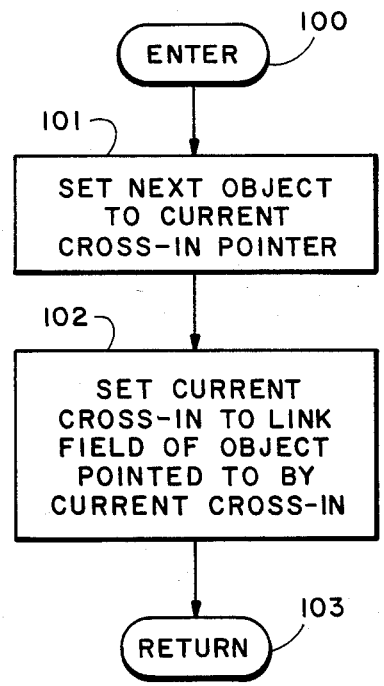

The procedure of FIG. 10 is very similar to that of FIG. 9 but concerns the cross-in list. In block 101, next object is set to the current cross-in pointer and in block 102 the current cross-in pointer is set to the link field of the object pointed to by current cross-in. In FIG. 10 advance is thereby made to the next object down and determination for an object to be pixelated has been made.

Figure 12:
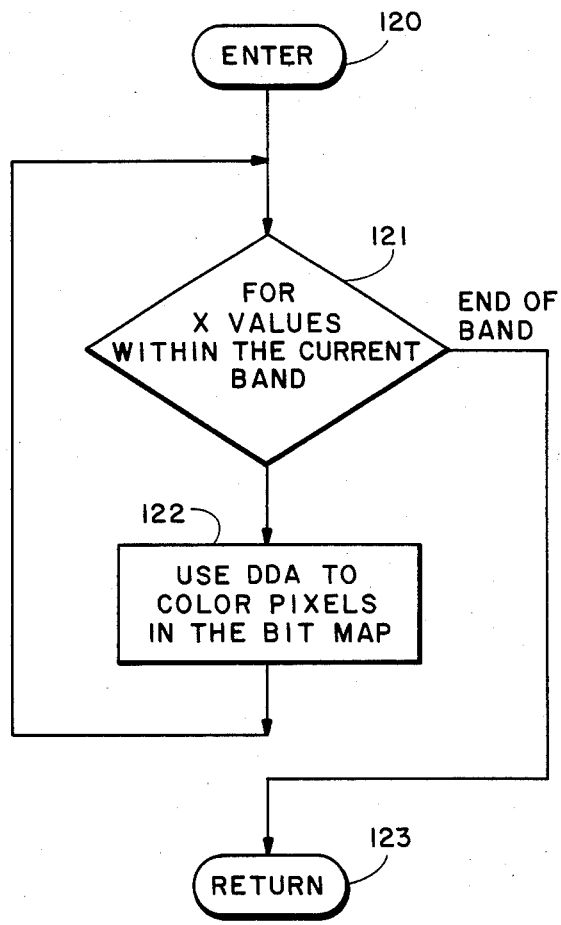

Referring now to FIG. 12 pertaining to the pixelation of an object within the band, for X values within the current band (block 121) DDA is used to color pixels in the bit map. The object can then be drawn. The pixels may be executed in colors via the words that are coded into the pixel bit map memory in a well understood manner, and DDA or a digital differential analyzer may be used to maintain the average positioning of pixels around the desired line or object to be drawn. The current value of DDA is retained in the object field between bands. However, neither the use of DDA to prevent line errors, or pixelation in a manner to achieve color, is necessary for the operation of the present invention. For instance, pixelation can occur directly in black and white. For X values that are not within the band, i.e. when the end of the band is reached, an end of band indication is given by block 121 and return is made to block 25 in FIG. 2.

Figure 11:
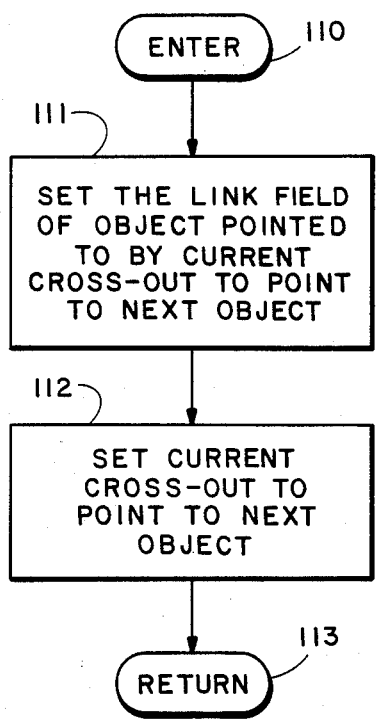

Now referring to FIG. 11, if a crossing was made into the next band as indicated by block 25 in FIG. 2, a link is provided into the cross-out list. In block 111 the link field of the object pointed to by the current-cross out is set to point to next object. In block 112 the current cross-out is set to point to next object. The object is thereby linked to the end of the cross-out list and the pointer is advanced.

Considering further the operation of crossing an object from one band to another, when pixelation proceeds to the end of a band, the pixelation of this particular object is discontinued inasmuch as there is no memory space beyond the band edge. However, the object is taken from the band list and added to the end of the cross-out list. Current cross-out which will be pointing to the previous object in the cross-out list will be advanced so that it points to the new object reaching the band edge. The link field of the previous object in the list will be made to point to the new object thereby adding the new object to the cross-out list. It will be understood the cross-out header points to the first item in the cross-out list and does not advance. If there is only one object in the list, the cross-out header and the cross-out pointer will point to the same object. When the next band is to be pixelated, the cross-in header is made equal to the previous cross-out header and the previous cross-out header is made NIL. The current cross-in pointer will point to the top of the list. The current cross-in pointer will then be used to traverse the cross-in list for pixelation (for crossing objects), in the same manner as the cross-out pointer was used to build the list.

It will be observed that the crossing list concept is utilized without requiring more than the storage space for five additional items, i.e. the cross-out header and pointer, the cross-in header and pointer, and the next primitive pointer. The lists for crossing, like the band lists, are an integral part of the display list itself.

There follows a listing of the program hereinbefore illustrated in FIGS. 1J through 12 and described in connection therewith.

APPENDIX I

{Program listing accompanying the instant application to be inserted here.}

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

```
BLISTS M68000 3(10)  5-JUL-84 10:37 Page 10
BLISTS.M68          CONST, TYPE, VAR DECLARATIONS 1125                        .RADIX  10
1126                        .ENABL  LC
1127                        .DSABL  GBL
1128
1129
1130                ;CONST
1131    0010 0000           GraphicsList     = $100000        ; address of beginning of graphics list
1132    000F FFFF            NilPacked       = $FFFFF         ;Nil pointer packed within graphics list
1133    002F FFFE            NilUnPacked     = $1FFFFE + GraphicsList
1134    0000 004B            NumBands        = 75             ;max 2400 rasters, 32 rasters/band
1135    0000                 MinBand         = 0
1136    004A                 MaxBand         = NumBands-MinBand-1
1137    0000                 OneBand         = 4
1138    0000                 Min             = oneband*minband
1139    0128                 Max             = oneband*maxband
1140    0020                 Bandwidth       = 32             ;rasters per band
1141    0000                 MinX            = 0
1142    001F                 MaxX            = 31
1143    FFF0 0000            Hi12bits        = $FFF00000      ;
1144    000F FFFF            Lo20bits        = $000FFFFF      ;
1145    0005                 Software        = 5              ; Software error
1146
1147
1148                ;TYPE
1149                ;       graphicsptrs = ^graphics object (absolute pointer)
1150                ;       headers = ARRAY [0..numbands] OF graphicsptrs;
1151                ;
1152                ;       packedptrs = ^graphics object, shifted right 1 bit (relative pointer)
1153                ;       packedheaders = ARRAY [0..numbands] of packedptrs;
1154
1155                ;VAR
1156    0F1680              BandList:            .blkl    NumBands    ;packedheaders to front of band lis
1161    0F17AC              CurrBandList:        .blkl    NumBands    ;headers       to current in band l
1162    0F18D8              PrimsPerBand:        .blkl    NumBands    ;count of primitives in band
1163    0F1A04              CrossList:           .blkl    1           ;packedptr     to front of crosslis
1164    0F1A08              CurrCrossList:       .blkl    1           ;packedptr     to current in crossl
1165    0F1A0C              NextCrossList:       .blkl    1           ;packedptr     to front of next cro
1166    0F1A10              CurrNextCrossList:   .blkl    1           ;graphicptr    to current in next c
1167    0F1A14              NextPrim:            .blkl    1           ;packedptr     to next in bandlist
1168    0F1A18              SaveXBeginBand:      .blkl    1
1169    0F1A1A              SaveXEndBand:        .blkw    1
1170    0F1A1A              SaveGPend:           .blkw    1
1171    0F1A1C              SaveBandNum:         .blkw    1
1172    0F1A1E              SaveMemoryEnd:       .blkw    1           ;graphic pointer
1173    0F1A20              HiBand:              .blkl    1           ;The highest nonempty band list
1174    0F1A22              NumPrims:            .blkw    1           ;Number of graphics in all lists
1175    0F1A26              Prims:               .blkl    1           ;Number of graphics in current band
1176    0F1A28              SavePrims:           .blkl    1           ;number of graphics in next band
1177    0F1A30
```

```
1178  0F1A34              NextAddr:   .blkl    1              ;graphicptr
1179  0F1A38              BandsPerPage: .blkw  1              ;maximum number of bands per page
1181  0F1A3A  03BA                    .PRINT  -SBLISTS
1182  0F1A3A  004B                    .PRINT  eBLISTS-.       ; Required Data Space
1187  0F1A3A  0800                    .CSECT                  ; Unused Data Space
1188                                  .EVEN
1189
1233
1237
1242
1243  0000*                                           ; PROCEDURE Initialize_BandLists;
(1)
1244          0000                                   ;
1245                                                 ; VAR
1246                                                 ;   Count    : LongInteger;
1247                                                 ;   Bandptr  : LongInteger;
1248                                                 ;   Currptr  : LongInteger;
1249                                                 ;   Primptr  : LongInteger;
1250                                                 ;
1251  0000*  48E7  4070           LABEL  INBANDLISTS ; BEGIN
1252                                      .IF NDF  JMPTBL
1253                                                 ;   Clear_Fault;
1254  001C*  42B9  000F  1A28             Count   = D1
1255  0022*  33FC  0000  000F             Bandptr = A1
1256  0028*  1A18                         Currptr = A2
1256  002A*  33FC  001F  000F             Primptr = A3
1257  0030*  1A1A                         movem.l  A1/A2/A3/D1, -(SP)
1257  0032*  4279  00UF  1A26
1258                                      ClrFault
1259  0038*  724A                         clr.l    NumPrims,1
1259  003A*  6F24                         move.w   #MinX, SaveXBeginBand,l
1260  003C*  43F9  000F  1680
1261  0042*  45F9  000F  17AC             move.w   #MaxX, SaveXEndBand,l
1262  0048*  47F9  000F  18D8
1263  004E*  24C9                         clr.w    HiBand,1
1264
1265                                      move.l   Bandptr, (Currptr)+    ; For Count = MinBand To MaxBand Do
1266  0050*  22FC  000A  FFFF                                            ;   Begin
1267  0056*  26FC  0000  0000             move.l   #NilPacked, (Bandptr)+
1267  005C*  51C9        FFF0             move.l   #0, (Primptr)+
1268                                      dbra     Count, 25
1269                                                                      ;     CurrBandList [Count] =
1270  0060*  23FC  0010  0000   15:       move.l   #GraphicsList, SaveGPend,1  ;       "BandList [Count];
1270  0066*  000F  1A1C                                                        ;     BandList [Count] = Nil;
                                                                                ;     PrimsPerBand [Count] = 0;
                                                                                ;   End;
                                                                                ;   SaveGPend = "GraphicsList;
1271                                                                     ; set memory end:
1272                                                                     ;   write different patterns into
1273                                                                     ;   memory, to determine where memory
1274                                                                     ;   begins to wrap around.  The
1275                                                                     ;   size is either 128K, 512K or 2Mb,
1276                                                                     ;   (might be multiple copy, so
1277                                                                     ;   save and restore tested memory)
1278
1279  006A*  1F39  0000  0000             move.b   <GraphicsList>,1, -(SP)
```

| Addr | Hex | | | Label | Instruction | Operands |
|------|-----|---|---|-------|-------------|----------|
| 1280 | 0070' | 1F39 | 0012 0000 | | move.b | \<GraphicsList + $20000\>.l, -(SP) |
| 1281 | 0076' | 1F39 | 0018 0000 | | move.b | \<GraphicsList + $80000\>.l, -(SP) |
| 1282 | 007C' | 13FC | 0020 | | move.b | #32, \<GraphicsList + $80000\>.l |
| 1283 | 0082' | 0000 | 001F | | | |
| 1284 | 0084' | 13FC | 001F | | move.b | #31, \<GraphicsList + $20000\>.l |
| 1285 | 008A' | 0000 001E | | | | |
|  | 008C' | 13FC | 001E | | move.b | #30, \<GraphicsList\>.l |
|  | 0092' | 0000 0020 | | | | |
| 1286 | 0094' | 0C39 | 0020 | | cmp.b | #32, \<GraphicsList + $80000\>.l |
|  | 009A' | 0000 | 001F | | | |
| 1287 | 009C' | 6722 | | | beq.s | 32$ |
| 1288 | 009E' | 0C39 | 001F | | cmp.b | #31, \<GraphicsList + $20000\>.l |
|  | 00A4' | 0000 | | | | |
| 1289 | 00A6' | 670C | 0011 | 30$: | beq.s | 31$ |
| 1290 | 00A8' | 23FC | 1A22 | | move.l | #\<GraphicsList + $1FFFE\>, SaveMemoryEnd.l |
|  | 00AE' | 000F | FFFE | | | |
| 1291 | 00B2' | 6016 | 0017 | | bra.s | 40$ |
| 1292 | 00B4' | 23FC | 1A22 | 31$: | move.l | #\<GraphicsList + $7FFFE\>, SaveMemoryEnd.l |
|  | 00BA' | 000F | FFFE | | | |
| 1293 | 00BE' | 600A | 002F | | bra.s | 40$ |
| 1294 | 00C0' | 23FC | 1A22 | 32$: | move.l | #\<GraphicsList + $1FFFE\>, SaveMemoryEnd.l |
|  | 00C6' | 000F | 0018 | | | |
| 1295 | 00CA' | 13DF | 0000 | 40$: | move.b | (SP)+, \<GraphicsList + $80000\>.l |
| 1296 | 00CA' | 13DF | 0012 0000 | | move.b | (SP)+, \<GraphicsList + $20000\>.l |
| 1297 | 00D0' | 13DF | 0010 0000 | | move.b | (SP)+, \<GraphicsList\>.l |
| 1298 | 00D6' | 13DF | 0E02 | | | |
| 1299 | | | | | | |
| 1300 | 00DC' | 4CDF | | | movem.l | (SP)+, A1/A2/A3/D1 |
| 1301 | 00E0' | 4E75 | | | rts | |
| 1302 | | | | | ; End; | |
| 1307 | | | | | | |
| 1308 | 00E2' | | | LABEL | RESORTBANDLISTS | |
| 1309 | | | | | | |
| 1310 | | | | | Procedure Resort_BandLists; | |
| 1311 | | | | | Var | |
| 1312 | | | | | Temp : Integer; | |
| 1313 | | | | | Count : LongInteger; | |
| 1314 | | | | | Current : LongInteger; | |
| 1315 | | | | | Return_X : Integer; | |
| 1316 | | | | | Addr : LongInteger; | |
| 1317 | 00E2' | 48E7 | C260 | | movem.l | A1/A2/D0/D1/D6, -(SP) |
| 1318 | 00E6' | 42B6 | | | clr.l | Return_X |
| 1319 | 00E8' | 2239 | 000F 1A28 | | move.l | NumPrims.l, Count |
| 1320 | 00EE' | 6100 | FF10 | | bsr | InBandLists |
| 1321 | 00F2' | 2279 | 000F 1A1C | | move.l | SaveGPend.l, Current |
| 1322 | | | | | | |
|  | | | | | Initialize_BandLists; | |
|  | | | | | Current = SaveGPend; | |
|  | | | | | For Count = 1 To NumPrims Do | |
|  | | | | | Begin | |
| 1323 | 00F8' | 45F9 | 000F 1A34 | 4$: | lea.l | NextAddr.l, Addr |
| 1324 | 00FE' | 5381 | | | subq.l | #1, Count |
| 1325 | 0100' | 6D00 | 00B6 | | blt.l | 9$ |
| 1326 | 0104' | 1011 | | | move.b | (Current), Temp |

```
1327  0106'  0280   0000  0OF0              andi.l    #$F0, Temp          ;   Case Current".Type Of
1328  010C'  0C40   0030                    cmpi.w    #$30, Temp          ;     0000, 0001, 0010, 0011:
1329  0110'  6C04                           bge.s     1s                  ;       X = Get_Minimum_X_Line
1330  0112'  103C   0030                    move.b    #$30, Temp          ;          (Current, Next);
1331  0116'  0C40   0080                    cmpi.w    #8*16, Temp         ;
1332  011A'  6E00   0066                    bgt       5s                  ;
1333  011E'  4EFB   00D2                    jmp       -46(PC,Temp)        ;
1334  0122'  2F09                           move.l    Current, -(SP)      ;
1335  0124'  2F0A                           move.l    Addr, -(SP)         ;
1336  0126'  4EB9   0000g                   jsr       MINXLINE.l          ;
1337  012C'  6000   006E                    bra       3s                  ;
1338  0130'                                  .blkw    1                   ;
1339  0132'  2F09                           move.l    Current, -(SP)      ;   0100:
1340  0134'  2F0A                           move.l    Addr, -(SP)         ;       X = Get_Minimum_X_Panel
1341  0136'  4EB9   0000g                   jsr       MINXPANEL.l         ;         (Current, Next);
1342  013C'  605E                           bra.s     3s                  ;
1343  013E'                                  .blkl    1                   ;
1344  0142'  2F09                           move.l    Current,.-(SP)      ;   0101:
1345  0144'  2F0A                           move.l    Addr, -(SP)         ;       X = Get_Minimum_X_Rectangle
1346  0146'  4EB9   0000g                   jsr       MINXRECTANGLE.l     ;          (Current, Next);
1347  014C'  604E                           bra.s     3s                  ;
1348  014E'                                  .blkl    1                   ;
1349  0152'  2F09                           move.l    Current, -(SP)      ;   0110:
1350  0154'  2F0A                           move.l    Addr, -(SP)         ;       X = Get_Minimum_X_Text
1351  0156'  4EB9   0000g                   jsr       MINXTEXT.l          ;          (Current, Next);
1352  015C'  603E                           bra.s     3s                  ;
1353  015E'                                  .blkl    1                   ;
1354
1355
1356  0162'                                  .blkb    16                  ;
1357
1358  0172'  2F09                           move.l    Current, -(SP)      ;   1000:
1359  0174'  2F0A                           move.l    Addr, -(SP)         ;       X = Get_Minimum_X_Line
1360  0176'  4EB9   0000g                   jsr       MINXLINE.l          ;          (Current, Next);
1361  017C'  601E                           bra.s     3s                  ;
1362  017E'                                  .blkl    1                   ;
1363                                                                      ;   Others:
1364  0182'  4246                            Fault    #software           ;       Display-fault (software)
1365  019A'                                  clr.w    Return_X            ;       X = 0;
1366                                                                      ; nextaddr is not incremented, and will loop
1367  019C'  3F06                           move.w    Return_X, -(SP)     ;     End_Case;
1368  019E'  6100   007E                    bsr       CalcBand            ;
1369  01A2'  3F06                           move.w    Return_X, -(SP)     ;
1370  01A4'  6100   00AE                    bsr       LinkBand            ;       Link_Band (Calc_Band (X));
1371  01A8'  2279   000F  1A34               move.l   NextAddr.l, Current ;       Current = Next;
1372  01AE'  23C9   000F  1A1C               move.l   Current, SaveGPend.l;       SaveGPend := current;
1373  01B4'  6000   FF48                    bra.l     4s                  ;     End_For;
1374  01B8'  4CDF   0643                    movem.l   (SP)+, A1/A2/D0/D1/D6 ;
1375  01BC'  4E75                            rts                          ;   End;
1376
```

```
1381                                          ; PROCEDURE Reset_BandLists;
1382      01BE'                                ; VAR
1383                                           ;    Return : Integer;
1384                                           ;
1385                                           ; BEGIN
1386                                           ;
1387                                           ;    bandsperpage := CEILING
1388      01BE'  2F06                          ;                   (GFRASTCOUNT DIV 32);
                        LABEL  RESETBANDLISTS Return    = D6

1388      01BE'  2F06                          move.l  D6, -(SP)
1389      01C0'  4EB9  0000g         0000g     jsr     GTRASTCOUNT.l
1390      01C6'  064b  001F                    add.w   #31,    Return
1391      01CA'  8CFC  0020                    divu.w  #32,    Return
1392      01CE'  33C6  000F          1A38      move.w  Return, bandsperpage.l
1393      01D4'  42B9  000F          1A2C      clr.l   Prims.l              ;    Prims := 0;
1394      01DA'  42B9  000F          1A30      clr.l   SavePrims.l          ;    SavePrims := 0;
1395      01E0'  23F9  000F          1680      move.l  <BandList+Min>.l,NextPri.l  ; NextPrim := BandList[Min];
                        1A14  000F
1396      01EA'  33FC  0000          000F      move.w  #MinBand, SaveBandNum.l  ; SaveBandNum := MinBand;
                        1A20
1397      01F2'  23FC  000F          FFFF      move.l  #Nilpacked, CrossList.l  ; CrossList := Nil;
                        1A04
1398      01FC'  23FC  000F          FFFF      move.l  #Nilpacked, NextCrossL.l ; NextCrossList := Nil;
                        1A0C
1399      0206'  23F9  000F          1A04      move.l  CrossList.l, CurrCross.l ; CurrCrossList := CrossList;
                        000F  1A08
1400      0210'  23FC  000F          1A0C      move.l  #NextCrossList, CurrNext.l ; CurrNextCrossList :=
1401                          1A10                                                 ;  ^NextCrossList;
1402      021A'  2C1F                          move.l  (SP)+, D6
1403      021C'  4E75                          rts                           ; End;
1404
1409                                           ; Function Calc_Band (X : Integer) :
1410      021E'                                ;                    Integer;
1411                                           ; Var
1412                                           ;    Return_CalcBand : Integer;
1413                                           ;    X : Integer;
1414                                           ;
1415                                           ; Begin
1416
                        LABEL  CALCBAND Return_CalcBand = D6
                        X               = D1

1417      021E'  2F01                          move.l  D1, -(SP)
1418      0220'  4286                          clr.l   Return_CalcBand
1419      0222'  322F  0008                    move.w  8(SP), X
1420      0226'  0281  0000  OFFF              andi.l  #$FFF, X
1421      022C'  EA49                          lsr.w   #5, X                 ;   X := X DIV 32;
1422      022E'  0C41  0000                    cmp.w   #MinBand, X           ;   IF X < MinBand
1423      0232'  6C06                          bge.s   3$                    ;     THEN
1424      0234'  3C3C  0000                    move.w  #MinBand,Return_CalcBand  ;   Calc_Band := MinBand
1425      0238'  600E                          bra.s   5$                    ;     ELSE
1426      023A'  0C41  004A          3$:       cmp.w   #MaxBand, X           ;     IF X > MaxBand
1427      023E'  6F06                          ble.s   4$                    ;       THEN
1428      0240'  3C3C  004A                    move.w  #MaxBand,Return_CalcBand  ; Calc_Band := MaxBand
```

| | | | | | | |
|---|---|---|---|---|---|---|
| 1429 | 0244' | 6002 | | | bra.s | 5$ |
| 1430 | 0246' | 3C01 | | | move.w | X, Return_CalcBand |
| 1431 | 0248' | 221F | | | move.l | (SP)+, D1 |
| 1432 | 024A' | 3F6F | 0002 | 4$: | move.w | 2(SP), 4(SP) |
| 1433 | 024E' | 3E9F | | 5$: | move.w | (SP)+, (SP) |
| 1434 | 0250' | 4E75 | | | rts | |

```
                ELSE
                    Calc_Band := X;
                ;
                ;
            End;
```

| | | | | | | |
|---|---|---|---|---|---|---|
| 1441 | 0254' | | | LABEL | LINKBAND | |

Procedure Link_Band (Band : Integer);

Var
  Temp : LongInteger;
  Band : Integer;
  GPendLoc : LongInteger;
  CurrLoc : LongInteger;

Begin

| | | | | | | |
|---|---|---|---|---|---|---|
| 1449 | 0254' | 48E7 | 40C0 | | Temp | = D1 |
| 1450 | 0258' | 322F | 0010 | | Band | = A0 |
| 1451 | 025C' | 0281 | 0000 FFFF | | GPendLoc | = A1 |
| 1452 | 0262' | B279 | 000F 1A26 | | CurrLoc | = A1 |
| 1453 | 0268' | 6F06 | | | movem.l | A0/A1/D1, -(SP) |
| 1454 | 026A' | 33C1 | 000F 1A26 | | move.w | 16(SP), Temp |
| 1455 | 0270' | E549 | | | andi.l | #$FFFF, Temp |
| 1456 | 0272' | 2041 | | | cmp.w | HiBand.l, Temp |
| 1457 | 0274' | D1FC | 000F 18D8 | | ble.s | 1$ |
| 1458 | 027A' | 5290 | | 1$: | move.w | Temp, HiBand.l |
| 1459 | 027C' | 2041 | | | move.l | Temp, Band |
| 1460 | 027E' | D1FC | 000F 17AC | | add.l | #PrimsPerBand, Band |
| 1461 | 0284' | 2239 | 000F 1A1C | | addq.l | #1, (band) |
| 1462 | 028A' | 0481 | 0000 0010 | | move.l | Temp, Band |
| 1463 | 0290' | E289 | | | move.l | #Currbandlist, Band |
| 1464 | 0292' | 0281 | 000F FFFF | | move.l | SaveGPend.l, Temp |
| 1465 | 0298' | 2250 | | | sub.l | #Graphicslist, Temp |
| 1466 | 029A' | 0291 | FFF0 0000 | | lsr.l | #1, Temp |
| 1467 | 02A0' | 8391 | | | andi.l | #Lo20bits, Temp |
| 1468 | 02A2' | 20B9 | 000F 1A1C | | or.l | (Band), CurrLoc |
| 1469 | 02A8' | 2279 | 000F 1A1C | | andi.l | #Hi12bits, (CurrLoc) |
| 1470 | 02AE' | 2211 | | | move.l | Temp, (CurrLoc) |
| 1471 | 02B0' | 0281 | FFF0 0000 | | move.l | SaveGPend.l, (Band) |
| 1472 | 02B6' | 0081 | 000F FFFF | | andi.l | #Hi12bits, Temp |
| 1473 | 02BC' | 2281 | | | ori.l | #NilPacked, Temp |
| 1474 | 02BE' | 52B9 | 000F 1A28 | | move.l | Temp, (GPendLoc) |
| 1475 | 02C4' | 4CDF | 0302 | | addq.l | #1, NumPrim.l |
| 1476 | 02C8' | 3F6F | 0002 | | movem.l | (SP)+, A0/A1/D1 |
| 1477 | 02CC' | 3E9F | | | move.w | 2(SP), 4(SP) |
| 1478 | 02CE' | 4E75 | | | move.w | (SP)+, (SP) |
| 1479 | 02D0' | | | | rts | |

```
                ;
                ;
                HiBand = Max(HiBand,Band);
                ;
                ;
                PrimsPerBand = PrimsPerBand + 1;
                ;
                Temp = SaveGPend;
                (Pack Temp address)
                ;
                (Clear top 12 bits of Temp address)
                ;
                CurrBandList(Band)^.Link = Temp;
                CurrBandList(Band)=SaveGPend;
                ;
                SaveGPend^.Link := Nil;
                NumPrims = NumPrims + 1;
                ;
            End;
```

| | | | | | | |
|---|---|---|---|---|---|---|
| 1484 | 02D2' | | | LABEL | GTNEXTGRAPHIC | |

Procedure Get_Next_Graphic (Var
  Graphicsptr : ^Graphics_object;
  Var EndofBand : Boolean);

```
1488                                              CurrPrim    = A0        ; var
1489                                              EndofBand   = A3        ;   CurrPrim  : LongInteger;
1490                                              CurrLoc     = A1        ;   EndofBand : LongInteger;
1491                                              NextLoc     = A2        ;   CurrLoc   : LongInteger;
1492                                              Crossptr    = D1        ;   NextLoc   : LongInteger;
1493                                              Bandptr     = D2        ;   Crossptr  : LongInteger;
1494                                              Temp        = D3        ;   Bandptr   : LongInteger;
1495                                                                      ;   Temp      : LongInteger;
1496
1497
1498    02D2'  48E7  70F0                movem.l  A0/A1/A2/A3/D1/D2/D3, -(SP); Begin
1499    02D6'  206F  0024                move.l   36(SP), CurrPrim        ;
1500    02DA'  266F  0020                move.l   32(SP), EndofBand       ;
1501    02DE'  52B9  000F  1A2C          addq.l   #1, Prims.l             ;   Prims = Prims + 1;
1502    02E4'  2439  000F  1A14          move.l   NextPrim.l, Bandptr     ;
1503    02EA'  2239  000F  1A08          move.l   CurrCrosslist.l, Crossptr;
1504    02F0'  168C                      move.b   #false, (EndofBand)     ;   EndofBand = False;
1505
1506    02F4'  0282  000F  FFFF          andi.l   #Lo20Bits, Bandptr      ;   {addr is 20 bits,
1507    02FA'  E38A                      lsl.l    #1, Bandptr             ;    with mult by 2}
1508    02FC'  0682  0010  0000          add.l    #GraphicsList, Bandptr  ;
1509
1510    0302'  0281  000F  FFFF          andi.l   #Lo20Bits, Crossptr     ;   {addr is 20 bits,
1511    0308'  E389                      lsl.l    #1, Crossptr            ;    with mult by 2}
1512    030A'  0681  0010  0000          add.l    #GraphicsList, Crossptr ;
1513
1514    0310'  0C82  002F  FFFE          cmpi.l   #NilUnPacked, Bandptr   ;   If (NextPrim = Nil)
1515    0316'  665C                      bne.s    7$                      ;   Then
1516    0318'  0C81  002F  FFFE          cmpi.l   #NilUnPacked, Crossptr  ;     If (CurrCrossList = Nil)
1517    031E'  6608                      bne.s    8$                      ;     Then
1518    0320'  16BC  00FF                move.b   #true, (EndofBand)      ;       EndofBand = True
1519    0324'  6000  0152                bra      14$                     ;     Else
1520                                                                      ;     Begin
1521    0328'  3639  000F  1A20    8$:   move.w   SaveBandNum.l, Temp     ;
1522    032E'  E54B                      lsl.w    #2, Temp                ;
1523    0330'  0283  0000  FFFF          andi.l   #$FFFF, Temp            ;
1524    0336'  2443                      move.l   Temp, NextLoc           ;
1525    0338'  D5FC  000F  18D8          add.l    #PrimsPerBand, NextLoc  ;
1526    033E'  2452                      move.l   (NextLoc), NextLoc      ;
1527    0340'  B5F9  000F  1A2C          cmp.l    Prims.l, NextLoc        ;
1528    0346'  6D00  000A                blt      12$                     ;       If Prims <= PrimsPerBand
1529    034A'  2081                      move.l   Crossptr, (CurrPrim)    ;       Then
1530                                                                      ;         CurrPrim = (CurrCrossList
1531                                                                      ;                     address))
1532    034C'  2241                12$:  move.l   Crossptr, CurrLoc       ;       Else
1533                                                                      ;         (Increment CurrCrossList
1534                                                                      ;                     pointer)
1535    034E'  6000  0110                bra      9$                      ;       Fault (Software);
1536    0352'                            Fault    #Software               ;       Abort_Copy;
1537    036A'  0000g 0000g               jsr      ABORTCOPY.l             ;       STOP;
        0370'  4E72  2700                STOP     #$2700                  ;   End
```

```
1538                                                    Else
1539  0374'  0C81  002F  FFFE      cmpl.l  #NilUnPacked, Crossptr ;
1540  037A'  664C                  bne.s   10$                    ;  If (CurrCrossList = Nil)
1541                                                               ;    Then
1542                                                               ;      Begin
1543  037C'  3639  000F  1A20      move.w  SaveBandNum.l, Temp    ;
1544  0382'  E54B                  lsl.w   #2, Temp               ;
1545  0384'  0283  0000  FFFF      andi.l  #$FFFF, Temp           ;
1546  038A'  2443                  move.l  Temp, NextLoc          ;
1547  038C'  D5FC  0000  18D8      add.l   #PrimsPerBand, NextLoc ;
1548  0392'  2452                  move.l  (NextLoc), NextLoc     ;
1549  0394'  B5F9  000F  1A2C      cmp.l   Prims.l, NextLoc       ;        If Prims <= PrimsPerBand
1550  039A'  6D00  000A            blt     16$                    ;          Then
1551  039E'  2082                  move.l  Bandptr, (CurrPrim)    ;            CurrPrim = (NextPrim
1552                                                               ;                       address);
1553                                                               ;            (Increment NextPrim ptr)
1554                                                               ;          Else
1555  03A0'  2442                  move.l  Bandptr, NextLoc       ;            Fault (Software);
1556  03A2'  6000  00CE            bra     15$                    ;            Abort_Copy;
1557  03A6'  4EB9  0000g 0000g     Fault   #Software              ;            STOP;
1558  03AC'  4E72  2700            jsr     ABORTCOPY.l            ;      End
1559                               STOP    #$2700                 ;
1560                                                               ;    Else
1561  03C8'  B282                  cmp.l   Bandptr, Crossptr      ;      If (NextPrim address <
1562  03CA'  6D4A                  blt.s   11$                    ;          CurrCrossList address)
1563                                                               ;        Then
1564                                                               ;          Begin
1565  03CC'  3639  000F  1A20      move.w  SaveBandNum.l, Temp    ;
1566  03D2'  E54B                  lsl.w   #2, Temp               ;
1567  03D4'  0283  0000  FFFF      andi.l  #$FFFF, Temp           ;
1568  03DA'  2443                  move.l  Temp, NextLoc          ;
1569  03DC'  D5FC  0000  18D8      add.l   #PrimsPerBand, NextLoc ;
1570  03E2'  2452                  move.l  (NextLoc), NextLoc     ;
1571  03E4'  B5F9  000F  1A2C      cmp.l   Prims.l, NextLoc       ;          If Prims <= PrimsPerBand
1572  03EA'  6D00  0008            blt     17$                    ;            Then
1573  03EE'  2082                  move.l  Bandptr, (CurrPrim)    ;              CurrPrim = (NextPrim
1574                                                               ;                         address);
1575  03F0'  2442                  move.l  Bandptr, NextLoc       ;              (Increment NextPrim
1576                                                               ;                         pointer)
1577  03F2'  607E                  bra.s   15$                    ;            Else
1578  03F4'  4EB9  0000g 0000g     Fault   #Software              ;              Fault (Software);
1579  03FA'  4E72  2700            jsr     ABORTCOPY.l            ;              Abort_Copy;
1580                               STOP    #$2700                 ;              STOP;
1581                                                               ;          End
1582                                                               ;        Else
1583                                                               ;          Begin
1584  0416'  3639  000F  1A20      move.w  SaveBandNum.l, Temp    ;
1585  041C'  E54B                  lsl.w   #2, Temp               ;
1586  041E'  0283  0000  FFFF      andi.l  #$FFFF, Temp           ;
1587  0424'  2443                  move.l  Temp, NextLoc          ;
1588  0426'  D5FC  000F  18D8      add.l   #PrimsPerBand, NextLoc ;
1589  042C'  2452                  move.l  (NextLoc), NextLoc     ;
1590  042E'  B5F9  000F  1A2C      cmp.l   Prims.l, NextLoc       ;          If Prims <= PrimsPerBand
```

```
1589  0434'  6D00  0008              blt     18s                 ;
1590  0438'  2081                    move.l  Crossptr, (CurrPrim) ;
1591                                                                       Then
1592  043A'  2241                    move.l  Crossptr, CurrLoc   ;         CurrPrim =
1593                                                             ;         (CurrCrossList address);
1594  043C'  6022                    bra.s   9s                  ;         (Increment
1595  043E'  Fault                   Fault   #Software           ;         CurrCrossList ptr)
1596  0456'  4EB9  0000g 0000g       jsr     ABORTCOPY.l         ;       Else
1597  045C'  4E72  2700              STOP    #$2700              ;         Fault (Software);
1598                                                             ;         Abort_Copy;
1599  0460'  23D1  000F  1A08  9s:   move.l  (CurrLoc), CurrCrossList.l  ; STOP;
1600  0466'  0269  FFFF  000F        andi.l  #Lo20bits, CurrCrossList.l  ; End
1601  046C'  1A08
1602  0470'  6006                    bra.s   14s                 ;
1603  0472'  23D2  000F  1A14  15s:  move.l  (NextLoc), NextPrim.l ;
1604  0478'  4CDF  0F0E              movem.l (SP)+, A0/A1/A2/A3/D1/D2/D3 ;
1605  047C'  2F57                    move.l  (SP), 8(SP)         ;
1606  047E'  508F                    addq.l  #8, SP              ;
1607  0482'  4E75                    rts                         ; End;
1608
1609
1610
1611
1612                            LABEL NEXTBANDLIST                ; Procedure Next_BandList (Var
1613  0484'                                                       ;   EndofPage : Boolean);
1614
1615                                                              ; Var
1616                                  EndofPage = A3              ;   EndofPage : LongInteger;
1617                                  BNum      = A1              ;   BNum : Integer;
1618                                  CurrLoc   = A2              ;   CurrLoc : LongInteger;
1619                                  Temp      = D1              ;   Temp : Integer;
1620
1621  0484'  48E7  4270               movem.l A1/A2/A3/D1/D6, -(SP) ; Begin
1622  0488'  26bF  0018               move.l  24(SP), EndofPage   ;
1623  048C'  5279  000F  1A20         addq.w  #1, SaveBandNum.l   ;   SaveBandNum = SaveBandNum + 1;
1624  0492'  4281                     clr.l   Temp                ;
1625  0494'  9289  000F  1A30         sub.l   SavePrims.l, Temp   ;
1626  049A'  23C1  000F  1A2C         move.l  Temp, Prims.l       ;   Prims = 0 - SavePrims;
1627  04A0'  42B9  000F  1A30         clr.l   SavePrims.l         ;   SavePrims = 0;
1628  04A6'  3239  000F  1A20         move.w  SaveBandNum.l, Temp ;
1629  04AC'  B279  000F  1A26         cmp.w   hiband.l, Temp      ;   If (((SaveBandNum > HiBand)
1630  04B2'  6F1A                     ble.s   10s                 ;          AND
1631  04B4'  0CB9  000F                cmp.l   #NilPacked, NextCrossList.l ; (NextCrossList = Nil)
1632  04BA'  0000g  FFFF
1633  04BE'  660E                     bne.s   10s                 ;          AND
1634  04C0'  4EB9  0000g 0000g        jsr     ISBACKGROUNDWHITE.l ;         (background is white))
1635  04C6'  0C06  00FF               cmp.b   #true, D6           ;
1636  04CA'  6602                     bne.s   10s                 ;        OR
1637  04CC'  600E                     bra.s   11s                 ;   (SaveBandNum >= BandsPerPage)
1638  04CE'  3239  000F  1A20  10s:   move.w  savebandnum.l, temp ;
1639  04D4'  B279  000F  1A38         cmp.w   bandsperpage.l, temp ;      Then
1640  04DA'  6D06                     blt.s   12s                 ;        EndofPage = True
1641  04DC'  16BC  00FF         11s:  move.b  #true, (EndofPage)  ;
```

| | | | | | |
|---|---|---|---|---|---|
| 1642 | 04E0' | 6070 | | bra.s | 13s | | Else |
| 1643 | 04E2' | 4281 | | clr.l | Temp | |
| 1644 | 04E4' | 3239 | | move.w | SaveBandNum.l, Temp | | Begin |
| 1645 | 04EA' | E549 | 000F | lsl.w | #2, Temp |
| 1646 | 04EC' | 2241 | | move.l | Temp, bNum |
| 1647 | 04EE' | 0679 | 0020 | addi.l | #Bandwidth, SaveBeginBand.l; | | SaveXBeginBand = |
| | 04F4' | 1A18 | | | | | SaveXBeginBand + BandWidth; |
| 1648 | 04F6' | 0679 | 0020 | addi.w | #Bandwidth, SaveXEndBand.l; | | SaveXEndBand = SaveXEndBand + |
| | 04FC' | 1A1A | | | | | Bandwidth; |
| 1649 | | | | | | | EndOfPage = False; |
| 1650 | 04FE' | 16BC | 0000 | move.b | #false, (EndOfPage) |
| 1651 | 0502' | D3FC | 000F | add.l | #BandList, BNum | | NextPrim = BandList [BNum] |
| | | | 1680 | | | |
| 1652 | 0508' | 23D1 | 000F | move.l | (BNum), NextPrim.l |
| | | | 1A14 | | | |
| 1653 | 050E' | 2479 | 000F | move.l | CurrNextCrossList.l, CurrLoc; |
| | | | 1A10 | | | |
| 1654 | 0514' | 223C | FFFF | move.l | #NilPacked, Temp |
| | | | FFFF | | | |
| 1655 | 051A' | 0281 | FFF0 | andi.l | #Lo20bits, Temp |
| 1656 | 0520' | 0292 | 0000 | andi.l | #Hi12bits, (CurrLoc) | | (Clear top 12 bits of Temp address) |
| 1657 | 0526' | 8392 | | or.l | Temp, (CurrLoc) |
| 1658 | 0528' | 23F9 | 000F | move.l | NextCrossList.l, CrossList.l; | | CrossList = NextCrossList; |
| | | | 1A0C | | | |
| 1659 | 052E' | 000F | 1A04 | | | |
| | 0532' | 23F9 | 000F | move.l | CrossList.l, CurrCrossList.l; | | CurrCrossList = CrossList; |
| | 0538' | 1A08 | | | | |
| 1660 | 053C' | 23FC | FFFF | move.l | #NilPacked, NextCrossList.l; | | NextCrossList = Nil; |
| | 0542' | 000F | 1A0C | | | |
| | 0546' | 45F9 | 000F | lea | NextCrossList.l, CurrLoc; | | CurrNextCrossList = |
| | | | 1A10 | | | | NextCrossList; |
| 1661 | 054C' | 23CA | 000F | move.l | CurrLoc, CurrNextCrossList.l; |
| 1662 | 0552' | 4CDF | 0E42 | movem.l | (SP)+, A1/A2/A3/D1/D6 |
| 1663 | 0556' | 2F57 | 0004 | move.l | (SP), 4(SP) |
| 1664 | 055A' | 588F | | addq.l | #4, SP | | End; |
| 1665 | 055C' | 4E75 | | rts | | | End; |
| 1672 | | | | | | |
| 1673 | | | | LABEL | SAVECROSSINGGRAPHIC | | Procedure Save_Crossing_Graphic |
| 1674 | | | | | | | (Graphicsptr : "Graphics_object); |
| 1675 | | | | | | | Var |
| 1676 | | | | | | | Prim : LongInteger; |
| 1677 | | | | | Prim = A0 | | Temp : LongInteger; |
| 1678 | | | | | Temp = D1 | | CurrLoc : LongInteger; |
| 1679 | | | | | CurrLoc = A1 | | Reg : LongInteger; |
| 1680 | | | | | Reg = D2 | |
| 1681 | 055E' | 48E7 | 60C0 | | | | Begin |
| 1682 | 0562' | 2D6F | 0014 | movem.l | A0/A1/D1/D2, -(SP) |
| 1683 | 0566' | 52B9 | 000F | move.l | 20(SP), Prim |
| 1684 | 056C' | 2208 | 1A30 | addq.l | #1, SavePrims.l | | SavePrims = SavePrims + 1; |
| 1685 | 056E' | 0481 | 0010 | move.l | Prim, Temp | | Temp = Prim; |
| 1686 | 0574' | E289 | 0000 | sub.l | #GraphicsList, Temp |
| 1687 | 0576' | 0281 | 000F | lsr.l | #1, Temp | | (Pack Temp address) |
| 1688 | 057C' | 2279 | FFFF | andi.l | #Lo20Bits, Temp | | (Clear top 12 bits of Temp address) |
| 1689 | 0582' | 2411 | 1A10 | move.l | CurrNextCrossList.l, CurrLoc; |
| 1690 | | | | move.l | (CurrLoc), Reg | | Reg = (CurrNextCrossList address); |

| Addr | Code | | | Label | Instruction | Operands | Comment |
|------|------|---|---|-------|-------------|----------|---------|
| 1691 | 0584' | 0282 | FFF0 0000 | | andi.l | #Hi12Bits, Reg | ; (Clear bottom 20 bits of Reg address) |
| 1692 | 05BA' | 8282 | | | or.l | Reg, Temp | ; (Mask Reg and Temp together) |
| 1693 | 058C' | 2281 | | | move.l | Temp, (CurrLoc) | ; |
| 1694 | 058E' | 23C8 | 1A10 | | move.l | Prim, CurrNextCrossList.l; CurrNextCrossList.Link = Temp; |
| 1695 | 0594' | 4CDF | 000F 0306 | | movem.l | (SP)+, A0/A1/D1/D2 | ; CurrNextCrossList = Prim; |
| 1696 | 0598' | 2F57 | 0004 | | move.l | (SP), 4(SP) | ; |
| 1697 | 059C' | 588F | | | addq.l | #4, SP | ; |
| 1698 | 059E' | 4E75 | | | rts | | ; End; |
| 1699 | | | | | | | |
| 1704 | 05A0' | | | LABEL | GPEND | | ; Function GPend : LongInteger; |
| 1705 | | | | | | | ; VAR |
| 1706 | | | | | | | ; Return_GPend : LongInteger; |
| 1707 | | | | | | | ; Begin |
| 1708 | | | | | | Return_GPend = D6 | ; |
| 1709 | | | | | | | ; |
| 1711 | 05A0' | 2C39 | 000F 1A1C | | move.l | SaveGPend.l, Return_GPend; GPend = SaveGPend; |
| 1712 | 05A6' | 4E75 | | | rts | | ; End; |
| 1717 | | | | | | | |
| 1718 | 05A8' | | | LABEL | MEMORYEND | | ; Function MemoryEnd : LongInteger; |
| 1719 | | | | | | | ; VAR |
| 1720 | | | | | | | ; Return_MemoryEnd : LongInteger; |
| 1721 | | | | | | Return_MemoryEnd = D6 | ; Begin |
| 1722 | | | | | | | ; |
| 1723 | | | | | | | ; |
| 1724 | 05A8' | 2C39 | 000F 1A22 | | move.l | SaveMemoryEnd.l, Return_MemoryEnd; MemoryEnd = SaveMemoryEnd; |
| 1725 | 05AE' | 4E75 | | | rts | | ; End; |
| 1726 | | | | | | | |
| 1730 | 05B0' | | | LABEL | BANDNUM | | ; Function BandNum : Integer; |
| 1731 | | | | | | | ; VAR |
| 1732 | | | | | | | ; Return_BandNum : Integer; |
| 1733 | | | | | | Return_BandNum = D6 | ; |
| 1734 | | | | | | | ; Begin |
| 1735 | | | | | | | ; |
| 1736 | 05B0' | 4286 | | | clr.l | Return_BandNum | ; |
| 1737 | 05B2' | 3C39 | 000F 1A20 | | move.w | SaveBandNum.l, Return_BandNum; BandNum = SaveBandNum; |
| 1738 | 05B8' | 4E75 | | | rts | | ; End; |
| 1739 | | | | | | | |
| 1743 | 05BA' | | | LABEL | XBEGINBAND | | ; Function XBeginBand : Integer; |
| 1744 | | | | | | | ; VAR |
| 1745 | | | | | | | ; Return_XBeginBand : Integer; |
| 1746 | | | | | | Return_XBeginBand = D6 | ; |
| 1747 | | | | | | | ; Begin |
| 1748 | | | | | | | ; |
| 1749 | 05BA' | 4286 | | | clr.l | Return_XBeginBand | ; |
| 1750 | 05BC' | 3C39 | 000F 1A18 | | move.w | SaveXBeginBand.l, Return_XBeginBand; XBeginBand=SaveXBeginBand; |
| 1751 | 05C2' | 4E75 | | | rts | | ; End; |
| 1752 | | | | | | | |
| 1756 | 05C4' | | | LABEL | XENDBAND | | ; Function XEndBand : Integer; |

```
1758                                                            ; VAR
1759                                                            ;    Return_XEndBand : Integer;
1760                                                            ;
1761                                          Return_XEndBand = D6
1762  05C4'  4286                             clr.l   Return_XEndBand              ; Begin
1763  05C6'  3C39 000F 1A1A                   move.w  SaveXEndBand.l, Return_XEndBand;  XEndBand = SaveXEndBand;
1764  05CC'  4E75                             rts                                  ; End;
1765
1770                                                            ; Procedure Set_GPend (Address :
1771                                                            ;                     LongInteger);
1772                                    LABEL   STGPEND
1773                                                            ; VAR
1774                                                            ;    Addr : LongInteger;
1775                                          Addr = A1         ;
1776  05CE'                                                     ; BEGIN
1777  05CE'  2F09                             move.l  A1,       -(SP)               ;
1778  05D0'  226F 0008                        move.l  8(SP),    Addr                ; If Addr < SaveMemoryEnd
1779  05D4'  B3F9 000F 1A22                   cmp.l   SaveMemoryEnd.l, Addr         ;   Then
1780  05DA'  6C06                             bge.s   2s                            ;
1781  05DC'  23C9 000F 1A1C                   move.l  Addr,     SaveGPend.l         ;     SaveGPend = Addr
1782  05E2'  225F                             move.l  (SP)+,    A1                  ;
1783  05E4'  2E9F                        2s:  move.l  (SP)+,    (SP)                ;
1784  05E6'  4E75                             rts                                   ; End;
1785
1786                                          .end ABORTC=         ****                1119     1535    1555    1577    1596
ADDR   =         %A1                1315#    1775#
ALPHA  =        0000                 302#
BAND   =         %A0                1445#
BANDLI  000F    1680                1161#    1261    1395    1651
BANDNU          05B0r        g      1731#
BANDPT=          %D2                1247#    1495#
BANDSP  000F    1A38                1179#    1392*   1576            1595
BANDW1          0020                1140#    1647
BNUM   =         %A1                1618#    1648
BOTSTA=  000F   1834                 247#
CALCBA          021Er        g      1368     1534    1554    1576            1595
CODED1=         ****          g     1253#    1364
CODE_A=         000A                 286#    1253
CODE_B=         0012                 278#
CODE_C=         000B                 279#
CODE_D=         0014                 287#    288#
CODE_E=         000C                 280#    1364    1534    1554
CODE_F=         000D                 281#
CODE_H=         000E                 282#
CODE_L=         000F                 283#
CODE_P=         0010                 284#
CODE_U=         0011                 285#
CODE_0=         0000                 268#     292
CODE_1=         0001                 269#     293
```

| | | | | | |
|---|---|---|---|---|---|
| CODE_2= | 0002 | 270# | | | |
| CODE_3= | 0003 | 271# | 294 | | |
| CODE_4= | 0004 | 272# | 295 | | |
| CODE_5= | 0005 | 273# | 296 | | |
| CODE_6= | 0006 | 274# | 297 | | |
| CODE_7= | 0007 | 275# | 298 | | |
| CODE_8= | 0008 | 276# | | | |
| CODE_9= | 0009 | 277# | | | |
| COPFAU= | 0003 | 295# | | | |
| COUNT = | $D1 | 1246# | 1312# | | |
| CRUSSL 000F | 1A04 | 1164# | 1397* | 1399 | 1658* 1659 |
| CRUSSP= | $D1 | 1494# | | | |
| CURRBA 000F | 17AC | 1162# | 1262 | 1460 | 1599* 1600* |
| CURRCK 000F | 1A08 | 1165# | 1399* | 1503 | |
| CURREN= | $A1 | 1313# | | | |
| CURRLO= | $A1 | 1447# | 1492# | 1619# | 1679# 1689 |
| CURRNE 000F | 1A10 | 1167# | 1401* | 1653 | 1662* 1694* |
| CURRPR= | $A0 | 1490# | | | |
| CURRPT= | $A2 | 1248# | | | |
| DEBUG = | 0000 | 1191# | 1192 | 1183 | |
| EBLIST= 000F | 1A80 | 224# | 1182 | | |
| ECOLPA= 000F | 11EC | 199# | | | |
| ECOMAN= 000F | 07C4 | 109# | | | |
| ECOORD= 000F | 1668 | 214# | | | |
| ECOPIE= 000F | 1B08 | 234# | | | |
| ECURSO= 000F | 0488 | 94# | | | |
| EEDGED= 000F | 0C60 | 164# | | | |
| EFONTS= 000F | 0AA0 | 144# | | | |
| EHOST = 000F | 05C0 | 104# | | | |
| EHWGRA= 000F | 1AC4 | 229# | | | |
| EHWTES= 000F | 1B30 | 244# | | | |
| EINITL= 000F | 0450 | 84# | | | |
| EINTEG= 000F | 167C | 219# | | | |
| EINTER= 000F | 0464 | 89# | | | |
| ELINED= 000F | 081C | 119# | | | |
| ELINES= 000F | 07D8 | 114# | | | |
| ELINPI= 000F | 0830 | 124# | | | |
| EMARKE= 000F | 0978 | 134# | | | |
| ENDOFB= | $A3 | 1491# | | | |
| ENDOFP= | $A3 | 1617# | | | |
| EPANEL= 000F | 0BD8 | 154# | | | |
| EPANLD= 000F | 0C1C | 159# | | | |
| EPBOUN= 000F | 0CEC | 179# | | | |
| EPFILL= 000F | 0CC8 | 174# | | | |
| EPHOEN= 000F | 043C | 79# | | | |
| EPNLPI= 000F | 0CA4 | 169# | | | |
| EQUEUE= 000F | 1610 | 204# | | | |
| ERAM = 000F | 4000 | 57# | 248 | 254 | |
| ERECPI= 000F | 0D68 | 194# | | | |
| ERECTA= 000F | 0D10 | 184# | | | |
| ERECTD= 000F | 0D54 | 189# | | | |

| Symbol | Value | | | | | | | | | |
|---|---|---|---|---|---|---|---|---|---|---|
| ESCANC= | 000F | 049C | 99# | | | | | | | |
| ETEST = | 000F | 0428 | 74# | | | | | | | |
| ETEXT = | 000F | 0934 | 129# | | | | | | | |
| ETEXTD= | 000F | 099C | 139# | | | | | | | |
| ETXTPI= | 000F | 0AB4 | 149# | | | | | | | |
| EUSER = | 000F | 1B1C | 239# | | | | | | | |
| EVIEW = | 000F | 1654 | 209# | | | | | | | |
| FALSE = | 000F | 0000 | 265# | | | | | | | |
| FLIGHT= | **** | 0000 | 1253 | | | | | | | |
| GPEND  | | 05A0r g | 1705# | | | | | | | |
| GPENDL= | | %A1 | 1446# | | | | | | | |
| GRAPHI= | 0010 | 0000 | 1131# | 1191 | | | | | | 1292 |
|        |      |      | 1294  | 1364 | | | | | | |
| GTNEXT= | | 02D2r g | 1485# | 1133 | 1253 | 1504 | 1280 | 1595 | 1283* | 1284* | 1285* | 1286 | 1288 | 1290 |
|         | |         |       | 1296* | 1297* | 1279* | 1462 | | 1512 | 1686 | | | | |
| GTRAST= | | **** g | 1118 | 1389 | 1270 | 1279 | 1280 | | 1281 | | | | | |
|         | |        |      |      | 1298* | | | | 1508 | | | | | |
| HIBAND= | 000F | 1A2b | 1174# | 1257* | 1452 | 1454* | 1630 | | | | | | | |
| HI12BI= | FFFU | 0000 | 1143# | 1466 | 1471 | 165b | 1691 | | | | | | | |
| HOSTTI= | | 0006 | 298# | | | | | | | | | | | |
| INBAND= | | 0000r g | 1243# | 1320 | | | | | | | | | | |
| ISBACK= | | **** g | 1103 | 1634 | | | | | | | | | | |
| JMPTBL= | | **** U | 1243 | 1308 | | | | | | | | | 1757 | |
|         | |        | 1771 | | | | | | | | | | | |
| LINKHA  | | 0254r g | 1370 | 1441# | | | | | | | | | | |
| LO2OB1= | 000F | FFFF | 1144# | 1464 | | | | | | | | | | |
| MARKER= | | 0002 | 304# | | | | | | | | | | | |
| MAX   = | | 0128 | 1139# | | | | | | | | | | | |
| MAXBAN= | | 004A | 1136# | 1139 | | | | | | | | | | |
| MAXX  = | | 001F | 1142# | 1256 | | | | | | | | | | |
| MEMORY= | | 05A8r g | 1718# | | | | | | | | | | | |
| MIN   = | | 0000 | 1138# | 1261 | 1262 | 1263 | 1395 | 1485 | 1613 | | | | | |
|         | |      |      |      |      |      | 1396 | | | | | | | |
| MINBAN= | | 0000 | 1135# | 1136 | 1138 | 1259 | 1600 | 1655 | 1688 | | | | | |
| MINX  = | | 0000 | 1141# | 1255 | | | | | | | | | | |
| MINXLI= | | **** | 1106 | 1336 | 1360 | 1426 | 1428 | 1422 | 1424 | | | | | |
| MINXPA= | | **** g | 1109 | 1341 | | | | | | | | | | |
| MINXRE= | | **** g | 1112 | 1346 | | | | | | | | | | |
| MINXTE= | | **** g | 1115 | 1351 | | | | | | | | | | |
| NEXTAD= | 000F | 1A34 | 1178# | 1323 | 1371 | | | | | | | | | |
| NEXTBA  | |      | 1613# | | | | | | | | | | | |
| NEXTCR= | 000F | 0484r g | 1166# | 1398* | 1401 | 1632 | 1658 | 1660* | 1661 | | | | | |
| NEXTLO= | 000F | 1A0C | 1493# | | | | | | | | | | | |
| NEXTPR= | | %A2 | 1168# | 1395* | 1502 | 1602* | 1652* | 1632 | 1654 | 1660 | 1673 | 1705 | 1718 | 1731 | 1744 |
|         | |     |       | 1266  | 1397 | 1398  | 1472  |      |      |      |      |      |      |      |      |
| NILPAC= | 000F | 1A14 | 1132# | 1514 | 1516 | 1539 | | | | | | | | |
| NILUNP= | 002F | FFFE | 294# | | | | | | | | | | | |
| NOCOP1= | | 0002 | 1134# | 1136 | 1161 | 1162 | 1163 | | | | | | | |
| NUMBAN  | |      | 1175# | 1254* | 1319 | 1474* | | | | | | | | |
| NUMPRI= | 000F | 1A28 | 1137# | 1138 | 1139 | | | | | | | | | |
| ONEBAN= | | 0004 | 296# | | | | | | | | | | | |
| OUTMEM= | | 0000 | 292# | | | | | | | | | | | |
| OVERRU= | | 0000 | 1677# | | | | | | | | | | | |
| PRIM  = | | %A0 | 1249# | | | | | | | | | | | |
| PRIMPT= | | %A3 | | | | | | | | | | | | |

| Symbol | Addr | | | | | | | | |
|---|---|---|---|---|---|---|---|---|---|
| FRIMS | 000F 1A2C | 1176# | | | | | | | |
| FRIMSP | 000F 18D8 | 1163# | | | | | | | |
| QUEFAU= | 0001 | 293# | | | | | | | |
| REG = | %D2 | 1680# | | | | | | | |
| RESETB | 01BEr g | 1382# | | | | | | | |
| RESORT | 00E2r g | 1308# | | | | | | | |
| RETURN= | %06 | 1314# | 1393* | 1501* | 1527 | 1548 | 1569 | 1588 | 1627* |
| SAVEBA | 000F 1A20 | 1172# | 1263 | 1457 | 1525 | 1546 | 1567 | 1586 | |
| SAVECR | 055Er g | 1673# | | | | | | | |
| SAVEGP | 000F 1A1C | 1171# | 1385# | 1414# | 1708* | 1721# | 1734# | 1747# | 1760# |
| SAVEME | 000F 1A22 | 1173# | 1396# | 1521 | 1542 | 1563 | 1582 | 1624* | 1629 |
| SAVEPR | 000F 1A30 | 1177# | | | | | | | |
| SAVEXB | 000F 1A18 | 1169# | 1270* | 1321 | 1372* | 1461 | 1468 | 1469 | 1711 |
| SAVEXE | 000F 1A1A | 1170# | 1290* | 1292* | 1294* | 1724 | 1779 | | |
| SBLIST= | 000F 1680 | 222# | 1394* | 1626 | 1628* | 1684* | | | |
| SCOLPA= | 000F 0D6C | 197# | 1255* | 1647* | 1750 | | | | |
| SCOMAN= | 000F 05C4 | 107# | 1256* | 1648* | 1763 | | | | |
| SCOORD= | 000F 1658 | 212# | 1158 | 1181 | | | | | |
| SCOPIE= | 000F 1AC8 | 232# | | | | | | | |
| SCURSO= | 000F 0468 | 92# | | | | | | | |
| SEDGED = | 000F 0C20 | 162# | | | | | | | |
| SFONTS= | 000F 09A0 | 142# | | | | | | | |
| SHOST = | 000F 04A0 | 102# | | | | | | | |
| SHWGRA= | 000F 1A84 | 227# | | | | | | | |
| SHWTES= | 000F 1B20 | 242# | | | | | | | |
| SINITU= | 000F 0440 | 82# | | | | | | | |
| SINTEG= | 000F 166C | 217# | | | | | | | |
| SINTER= | 000F 0454 | 87# | | | | | | | |
| SLINED= | 000F 07DC | 117# | | | | | | | |
| SLINES= | 000F 07C8 | 112# | | | | | | | |
| SLINPI= | 000F 0820 | 122# | | | | | | | |
| SMARKE= | 000F 0938 | 132# | | | | | | | |
| SOFTWA= | 0005 | 297# | 1145# | 1364 | 1534 | 1554 | 1576 | 1595 | |
| SPANEL= | 000F 0AB8 | 152# | | | | | | | |
| SPANLD= | 000F 0BDC | 157# | | | | | | | |
| SPBOUN= | 000F 0CCC | 177# | | | | | | | |
| SPFILL= | 000F 0CA8 | 172# | | | | | | | |
| SPHUEN= | 000F 042C | 77# | | | | | | | |
| SPNLPI= | 000F 0C64 | 167# | | | | | | | |
| SQUEUE= | 000F 11F0 | 202# | | | | | | | |
| SRAM = | 000F 0400 | 55# | 70 | | | | | | |
| SRECPI= | 000F 0D58 | 192# | | | | | | | |
| SRECTA= | 000F 0CF0 | 182# | | | | | | | |
| SRECTD= | 000F 0D14 | 187# | | | | | | | |
| SSCANC= | 000F 048C | 97# | | | | | | | |
| STEST = | 000F 0400 | 72# | | | | | | | |
| STEXT = | 000F 0834 | 127# | | | | | | | |
| STEXID= | 000F 097C | 137# | | | | | | | |
| SIGPEN | 05CEr g | 1771# | | | | | | | |
| STXTPI= | 000F 0AA4 | 147# | | | | | | | |
| SUSER = | 000F 1B0C | 237# | | | | | | | |

| | | | | | | | | | 1737 |
| | | | | | | | | | 1644 |
| | | | | | | | | 1638 | |
| | | | | | | | | 1781* | |

| | | | | | | | | | | | | |
|---|---|---|---|---|---|---|---|---|---|---|---|---|
| SVIEW = 000F | 1614 | | | | | | | | | | | |
| TEMP = | %D1 | | | | | | | | | | | |
| TOPSTA= 000F | 4000 | | | | | | | | | | | |
| TRUE = | 00FF | | | | | | | | | | | |
| VECTOR= | 0001 | | | | | | | | | | | |
| X = | %D1 | | | | | | | | | | | |
| XBEGIN | 05BAr g | | | | | | | | | | | |
| XENDHA | 05C4r g | | | | | | | | | | | |
| . | 05E8r | 207# | | | | | | | | | | |
| | | 1311# | | | | | | | | | | |
| | | 249# | | | | | | | | | | |
| | | 264# | 1444# | 1496# | 1620# | 1678# | | | | | | |
| | | 303# | 1192 | 1364 | 1518 | 1534 | 1554 | 1576 | 1595 | 1635 | 1641 | |
| | | 1415# | | | | | | | | | | |
| | | 1744# | | | | | | | | | | |
| | | 1757# | | | | | | | | | | |
| | 85# | 70# | 72 | 73# | 74 | 75# | 77 | 78# | 79 | 80# | 82 | 83# | 84 |
| | 102 | 87 | 88# | 89 | 90# | 92 | 93# | 94 | 95# | 97 | 98# | 99 | 100# |
| | 118# | 103# | 104 | 105# | 107 | 108# | 109 | 110# | 112 | 113# | 114 | 115# | 117 |
| | 134 | 119 | 120# | 122 | 123# | 125 | 127 | 128# | 129 | 130# | 132 | 133# |
| | 150# | 135# | 137 | 138# | 139 | 140# | 142 | 143# | 144 | 145# | 147 | 148# | 149 |
| | 167 | 152 | 153# | 154 | 155# | 157 | 158# | 159 | 160# | 162 | 163# | 164 | 165# |
| | 183# | 168# | 169 | 170# | 172 | 173# | 174 | 175# | 177 | 178# | 179 | 180# | 182 |
| | 199 | 184 | 185# | 187 | 188# | 189 | 190# | 192 | 193# | 194 | 195# | 197 | 198# |
| | 215# | 200# | 202 | 203# | 204 | 205# | 207 | 208# | 209 | 210# | 212 | 213# | 214 |
| | 232 | 217 | 218# | 219 | 220# | 222 | 223# | 224 | 225# | 227 | 228# | 229 | 230# |
| | 248# | 233# | 234 | 235# | 237 | 238# | 239 | 240# | 242 | 243# | 244 | 245# | 247 |
| | 1170# | 249 | 254 | 1158# | 1161# | 1162# | 1163# | 1164# | 1165# | 1166# | 1167# | 1168# | 1169# |
| | 1338# | 1171# | 1172# | 1173# | 1174# | 1175# | 1176# | 1177# | 1178# | 1179# | 1181 | 1182 | 1183 |
| | | 1343# | 1348# | 1353# | 1355# | 1362# | | | | | | | |

| | | | | | | | | |
|---|---|---|---|---|---|---|---|---|
| CLEAR0 | 924# | | | | | | | |
| CLEAR1 | 928# | | | | | | | |
| CLEAR2 | 936# | | | | | | | |
| CLEAR3 | 944# | | | | | | | |
| CLEAR4 | 950# | | | | | | | |
| CLEAR5 | 955# | | | | | | | |
| CLEAR6 | 961# | | | | | | | |
| CLEAR7 | 967# | | | | | | | |
| CLEAR8 | 973# | | | | | | | |
| CLRFAU | 907# | 1253 | | | | | | |
| CLR10 | 980# | | | | | | | |
| CLR12 | 987# | | | | | | | |
| CLR14 | 994# | | | | | | | |
| CLR16 | 1001# | | | | | | | |
| CLR18 | 1008# | | | | | | | |
| DECRYP | 406# | | | | | | | |
| DELETE | 799# | | | | | | | |
| DIVS16 | 762# | | | | | | | |
| DIV16 | 588# | | | | | | | |
| DIV16L | 652# | | | | | | | |
| DIV32 | 608# | | | | | | | |
| DIV32L | 679# | | | | | | | |
| FAULT | 893# | 1364 | 1534 | 1554 | 1576 | 1595 | | |
| GETY | 411# | | | | | | | |
| INTERS | 809# | | | | | | | |
| LABEL | 1022# | 1243 | 1308 | 1382 | 1410 | 1441 | 1465 | 1613 | 1673 | 1705 | 1718 | 1731 | 1744 | 1757 | 1771 |
| MULS32 | 710# | | | | | | | |
| MUL32 | 536# | | | | | | | |
| MUL32H | 630# | | | | | | | |

| | | | | | | | | | | | | | |
|---|---|---|---|---|---|---|---|---|---|---|---|---|---|
| MUL323 | 571* | | | | | | | | | | | | |
| PUTPIX | 356* | | | | | | | | | | | | |
| PUTXIN | 395* | | | | | | | | | | | | |
| PUTYIN | 401* | | | | | | | | | | | | |
| RDCH | 506* | | | | | | | | | | | | |
| SETPIX | 345* | | | | | | | | | | | | |
| WRCH | 452* | | | | | | | | | | | | |
| WRINT | 500* | | | | | | | | | | | | |
| WRLN | 479* | | | | | | | | | | | | |
| WRSTR | 462* | | | | | | | | | | | | |
| XADD | 379* | | | | | | | | | | | | |
| XINCK | 363* | | | | | | | | | | | | |
| YADD | 389* | | | | | | | | | | | | |
| YDECR | 374* | | | | | | | | | | | | |
| YINCR | 369* | | | | | | | | | | | | |
| ADD | 1390 | 1457 | 1460 | 1508 | 1512 | 1525 | 1546 | 1567 | 1586 | 1651 | 1565 | 1584 | 1600 | 1655 | 1656 |
| ADDI | 1647 | 1648 | 1501 | 1605 | 1624 | 1665 | 1684 | 1697 | 1523 | 1544 | | | | |
| ADDQ | 1458 | 1474 | 1451 | 1464 | 1466 | 1471 | 1506 | 1510 | | | | | | |
| ANDI | 1327 | 1420 | | | | | | | | | | | | |
| | 1688 | 1691 | | | | | | | | | | | | |
| BEQ | 1287 | 1289 | 1780 | | | | | | | | | | | |
| BGE | 1329 | 1423 | | | | | | | | | | | | |
| BGT | 1332 | | | | | | | | | | | | | |
| BLE | 1260 | 1427 | 1453 | 1631 | 1570 | 1589 | | | | | | | | |
| BLT | 1325 | 1528 | 1549 | 1561 | 1636 | | 1640 | | | 1373 | 1429 | 1533 | 1553 | 1575 | 1594 |
| BNE | 1515 | 1517 | 1540 | 1633 | 1347 | | | | | | | | | |
| BRA | 1291 | 1293 | 1337 | 1342 | | 1352 | 1361 | | | | | | | |
| | | | 1642 | | | | | | | | | | | |
| BSR | 1601 | 1637 | 1370 | | | | | | | | | | | |
| CLR | 1320 | 1368 | 1453 | 1365 | 1393 | 1394 | 1418 | 1625 | 1628 | 1643 | 1736 | 1749 | 1762 | 1639 | 1779 |
| CMP | 1254 | 1257 | 1318 | 1561 | 1452 | 1527 | 1548 | 1559 | 1569 | 1588 | 1630 | 1632 | 1635 | | |
| CMPI | 1286 | 1288 | 1422 | 1426 | 1516 | 1539 | | | | | | | | |
| CMPI | 1328 | 1331 | 1514 | | | | | | | | | | | |
| DBRA | 1268 | | | | | | | | | | | | | |
| DIVU | 1391 | | | | | | | | | | | | | |
| JMP | 1333 | | | | | | | | | | | | | |
| JSR | 1253 | 1336 | 1341 | 1346 | 1351 | 1360 | 1364 | 1389 | 1534 | 1535 | 1554 | 1555 | 1576 | 1577 | 1595 |
| | 1596 | 1634 | | | | | | | | | | | | |
| LEA | 1261 | 1262 | 1263 | 1323 | 1661 | 1564 | 1583 | 1645 | | | | | | |
| LSL | 1455 | 1507 | 1511 | 1522 | 1543 | | | | | | | | | |
| LSR | 1421 | 1463 | 1687 | | | | | | | | | | | |
| MOVE | 1253 | 1255 | 1256 | 1259 | 1264 | 1266 | 1267 | 1270 | 1279 | 1280 | 1281 | 1283 | 1284 | 1285 | 1290 |
| | 1292 | 1294 | 1296 | 1297 | 1298 | 1319 | 1321 | 1326 | 1330 | 1334 | 1335 | 1339 | 1340 | 1344 | 1345 |
| | 1349 | 1350 | 1358 | 1359 | 1364 | 1367 | 1369 | 1371 | 1372 | 1388 | 1392 | 1395 | 1396 | 1397 | 1398 |
| | 1399 | 1401 | 1402 | 1417 | 1419 | 1424 | 1426 | 1430 | 1431 | 1432 | 1433 | 1450 | 1454 | 1456 | 1459 |
| | 1461 | 1465 | 1468 | 1469 | 1470 | 1473 | 1476 | 1477 | 1499 | 1500 | 1502 | 1503 | 1504 | 1518 | 1521 |
| | 1524 | 1526 | 1529 | 1531 | 1534 | 1542 | 1545 | 1547 | 1550 | 1552 | 1554 | 1563 | 1566 | 1568 | 1571 |
| | 1573 | 1576 | 1582 | 1585 | 1587 | 1590 | 1592 | 1595 | 1599 | 1602 | 1604 | 1623 | 1627 | 1629 | 1638 |
| | 1641 | 1644 | 1646 | 1650 | 1652 | 1653 | 1654 | 1658 | 1658 | 1660 | 1662 | 1664 | 1683 | 1685 | 1689 |
| | 1690 | 1693 | 1694 | 1696 | 1711 | 1724 | 1737 | 1750 | 1763 | 1777 | 1778 | 1781 | 1782 | 1783 | |
| MOVEM | 1251 | 1300 | 1317 | 1374 | 1449 | 1475 | 1498 | 1603 | 1622 | 1663 | 1682 | 1695 | | |
| OR | 1467 | 1657 | 1692 | | | | | | | | | | | |

| | | | | | | | | | | | | |
|---|---|---|---|---|---|---|---|---|---|---|---|---|
| ORI | 1472 | | | | | | | | | | | |
| RTS | 1301 | 1375 | 1403 | 1434 | 1478 | 1606 | 1666 | 1698 | 1712 | 1725 | 1738 | 1751 | 1764 | 1784 |
| STOP | 1536 | 1556 | 1578 | 1597 | | | | | | | | | |
| SUB | 1462 | 1626 | 1686 | | | | | | | | | | |
| SUBQ | 1324 | | | | | | | | | | | | |
| .ASECT | 69 | | | | | | | | | | | | |
| .BLKB | 1355 | 1157 | | | | | | | | | | | |
| .BLKL | 1161 | 1162 | 1163 | 1164 | 1165 | 1166 | 1167 | 1168 | 1171 | 1173 | 1175 | 1176 | 1177 | 1178 | 1343 |
| | 1348 | 1353 | 1362 | | | | | | | | | | |
| .BLKW | 1169 | 1170 | 1172 | 1174 | 1179 | 1338 | | | | | | | |
| .CSECT | 1187 | | | | | | | | | | | | |
| .DSABL | 1128 | | | | | | | | | | | | |
| .ENABL | 1127 | | | | | | | | | | | | |
| .END | 1786 | | | | | | | | | | | | |
| .ENDC | 256 | 1185 | 1231 | 1243 | 1308 | 1382 | 1410 | 1441 | 1485 | 1613 | 1673 | 1705 | 1718 | 1731 | 1744 |
| | 1757 | 1771 | | | | | | | | | | | |
| .EVEN | 1159 | 1188 | | | | | | | | | | | | |
| .GLOBL | 1103 | 1106 | 1109 | 1112 | 1115 | 1118 | 1119 | 1253 | 1364 | 1534 | 1554 | 1576 | 1595 | 1731 | 1744 |
| .IF | 254 | 1183 | 1192 | 1243 | 1308 | 1382 | 1410 | 1441 | 1485 | 1613 | 1673 | 1705 | 1718 | | |
| | 1757 | 1771 | | | | | | | | | | | |
| .IFF | 1243 | 1308 | 1382 | 1410 | 1441 | 1485 | 1613 | 1673 | 1705 | 1718 | 1731 | 1744 | 1757 | 1771 | 1438 |
| | | | | | | | | | | | | |
| .LIST | 258 | 532 | 1032 | 1037 | 1099 | 1123 | 1160 | 1186 | 1232 | 1236 | 1240 | 1305 | 1379 | 1407 | |
| .MACRO | 1482 | 1610 | 1670 | 1702 | 1716 | 1729 | 1742 | 1755 | 1768 | | | | | |
| | 335 | 356 | 363 | 369 | 374 | 379 | 389 | 395 | 401 | 406 | 411 | 452 | 462 | 479 | 500 |
| | 506 | 536 | 571 | 588 | 608 | 630 | 652 | 679 | 710 | 762 | 799 | 809 | 893 | 907 | 924 |
| | 928 | 936 | 944 | 950 | 955 | 961 | 967 | 973 | 980 | 987 | 994 | 1001 | 1008 | 1022 | |
| .NLIST | 1 | 259 | 530 | 1034 | 1097 | 1121 | 1156 | 1180 | 1190 | 1234 | 1238 | 1303 | 1377 | 1405 | 1436 |
| | 1479 | 1608 | 1668 | 1700 | 1714 | 1727 | 1740 | 1753 | 1766 | | | | | |
| .PRINT | 1181 | 1182 | | | | | | | | | | | |
| .RADIX | 1126 | | | | | | | | | | | | |
| .SBTTL | 2 | 261 | 306 | 427 | 531 | 1031 | 1036 | 1098 | 1122 | 1235 | 1239 | 1304 | 1378 | 1406 | 1437 |
| .TITLE | 1480 | 1481 | 1609 | 1669 | 1701 | 1715 | 1728 | 1741 | 1754 | 1767 | | | | |
| | 1035 | | | | | | | | | | | | |

05E8

```
Errors Detected:    0
Warnings Generated: 0
*BLISTS,BLISTS=BIN:MEMMAP,BIN:MACROS,BLISTS/C
Core Used:   22P
Run-time: 8.736 seconds
```

We claim:

1. The method of providing information for a graphics display in response to identification, in the form of high level graphics commands, of graphics to be portrayed, comprising the steps of:
   receiving commands for said graphics,
   dividing said commands into lists related to regions of the display,
   transforming the commands sequentially by lists into information for writing to respective regions of said display,
   and transferring commands from one list to a crossing list as they relate to graphics extending beyond a currently written region of said display into another region whereby to continue the writing of a transferred command in the last mentioned region, including employing said crossing list in writing the last mentioned region.

2. The method according to claim 1 wherein said information for writing to said display is written sequentially and alternately to plural memory regions from which raster information is sequentially and alternately provided to said display.

3. The method of providing information for a graphics display, in response to identification, in the form of high level graphics commands, of graphics to be portrayed, comprising the steps of:
   receiving the commands for said graphics,
   dividing said commands into lists corresponding to regions of said display in which they are to be portrayed,
   and forming said display sequentially by regions in response to separate lists of graphics identification,
   including forming said display with linking commands for graphics extending between regions whereby a last mentioned command can be used sequentially first for display in one region and then in another region according to the extension of said graphics.

4. The method of providing raster information for a graphics display, in response to digital indentification of one or more graphics to be portrayed, comprising the steps of:
   forming a plurality of successive images each corresponding to a band of said display,
   receiving the identification of said graphics and dividing said identification of said graphics into sublists, each corresponding to a band of said display within which one or more graphics to be portrayed,
   entering each of said graphics in the form of pixel indentifying data into memory for display insofar as the graphics are contained in a sublist for a given band,
   repeating the last step for a subsequent band,
   forming a linking list for graphics extending into a band subsequent to the given band,
   and merging said linking list with a further sublist of graphics corresponding to the subsequent band for entry into said memory substantially concurrently with pixel identifying data for graphics in the sublist for the subsequent band.

5. The method according to claim 4 wherein said forming of a plurality of successive images occurs substantially concurrently with forming of linking lists and merging linking lists with further sublists for entry into memory.

6. The method of providing information for a graphics display, in response to commands identifying graphics to be portrayed, comprising the steps of:
   receiving the commands for said graphics,
   forming said graphics commands into a display list,
   dividing said display list into sublists corresponding to separate bands of said display, according to the portion of the display where graphics are to be initially portrayed,
   entering the graphics from a sublist for a first band into a first portion of bit map memory,
   forming a linking list for graphics, the portrayal of which would extend from said first band of said display into a second and adjacent band,
   merging said linking list with the sublist for said second band,
   and entering the merged graphics from said linking list and the sublist for the second band into a second portion of bit map memory,
   wherein the first and second portions of bit map memory are alternately read out for providing said display.

7. The method according to claim 6 wherein said graphics for said second band are entered into said second portion of bit map memory while said first portion of bit map memory is read out for display.

8. The method of providing information for a graphics display, in response to high level computer commands for graphics to be portrayed, comprising the steps of:
   receiving the commands for said graphics,
   forming said commands into a display list,
   dividing said display list into sublists corresponding to separate bands of said display according to the portion of the display where graphics are to be displayed,
   transforming commands from a sublist for a first band into pixel information for entry into a first portion of bit map memory,
   maintaining a crossing list for commands as would identify graphics extending beyond said first band,
   and transforming commands from said crossing list and from a subsequent sublist into pixel information for entry into a second portion of bit map memory,
   wherein the first and second portions of bit map memory are alternately read out for providing said display.

9. The method according to claim 8 wherein pixel information for a subsequent band is entered into said second portion of memory while a first portion of memory is read out for display.

* * * * *